(12) United States Patent
Sears

(10) Patent No.: US 10,867,538 B1
(45) Date of Patent: Dec. 15, 2020

(54) SYSTEMS AND METHODS FOR TRANSFERRING AN IMAGE TO AN ARRAY OF EMISSIVE SUB PIXELS

(71) Applicant: Facebook Technologies, LLC, Menlo Park, CA (US)

(72) Inventor: Jasmine Soria Sears, Kirkland, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/292,366

(22) Filed: Mar. 5, 2019

(51) Int. Cl.
G09G 3/00 (2006.01)
G02B 27/01 (2006.01)

(52) U.S. Cl.
CPC ........... G09G 3/007 (2013.01); G02B 27/017 (2013.01); G09G 2320/068 (2013.01); G09G 2320/0626 (2013.01)

(58) Field of Classification Search
CPC ........... G09G 3/007; G09G 2320/0626; G09G 2320/068
See application file for complete search history.

(56) References Cited

U.S. PATENT DOCUMENTS

| 5,742,262 | A | * | 4/1998 | Tabata | G02B 27/0081 345/8 |
| 5,748,164 | A | * | 5/1998 | Handschy | G09G 3/3406 345/84 |
| 5,818,419 | A | * | 10/1998 | Tajima | G09G 3/2033 345/691 |
| 6,052,105 | A | * | 4/2000 | Yamamoto | G09G 3/2022 345/94 |
| 6,222,512 | B1 | * | 4/2001 | Tajima | G09G 3/2029 345/63 |
| 6,249,265 | B1 | * | 6/2001 | Tajima | G09G 3/2029 345/63 |
| 6,313,888 | B1 | * | 11/2001 | Tabata | G09G 3/001 348/739 |

(Continued)

OTHER PUBLICATIONS

Sears et al., "Systems and Methods Utilizing Rotatable Optics for Projecting Light to a Viewer", U.S. Appl. No. 16/190,758 dated Nov. 14, 2018, 94 pages.

(Continued)

Primary Examiner — Amy Onyekaba
(74) Attorney, Agent, or Firm — FisherBroyles, LLP

(57) ABSTRACT

A method for transferring an image to a subpixel array may include generating a set of subframes in which each subframe contains a fraction of the range of intensities of the image. The bit-depth of the subframes may be reduced from the bit-depth of the image. The computer-implemented method may include (1) receiving image data for an image including a set of intensities in one or more channels, (2) processing the image data into subframe data for a plurality of subframes, each subframe including a fractional range of intensities that are a subset of the set of intensities of the image, and (3) temporally multiplexing the plurality of subframes generated from the subframe data to reconstitute the image in a viewing region using an optical system having a light deviator that laterally shifts light from an emissive array. Various other apparatus, systems, and methods are also disclosed.

20 Claims, 12 Drawing Sheets

(56) References Cited

U.S. PATENT DOCUMENTS

| | | | |
|---|---|---|---|
| 6,535,195 B1* | 3/2003 | Nelson | G09G 3/342 345/100 |
| 6,707,516 B1* | 3/2004 | Johnson | G02B 27/288 348/E5.133 |
| 7,407,295 B2* | 8/2008 | Damera-Venkata | G03B 21/14 348/798 |
| 7,463,272 B2* | 12/2008 | Damera-Venkata | G06T 3/4069 345/694 |
| 8,611,004 B2* | 12/2013 | Newell | G02C 7/088 359/399 |
| 9,022,582 B2* | 5/2015 | Kang | H04N 9/3197 353/99 |
| 9,335,548 B1* | 5/2016 | Cakmakci | G06F 3/017 |
| 9,354,494 B2* | 5/2016 | Mashitani | G03B 21/142 |
| 9,478,174 B2* | 10/2016 | Yaras | G09G 3/3413 |
| 9,693,048 B2* | 6/2017 | Smithwick | H04N 13/349 |
| 10,356,407 B2* | 7/2019 | Forsyth | H04N 19/124 |
| 2002/0003542 A1* | 1/2002 | Tanaka | G09G 3/2033 345/581 |
| 2003/0001799 A1* | 1/2003 | Bae | G09G 3/2922 345/37 |
| 2004/0080517 A1* | 4/2004 | Song | G09G 3/2022 345/596 |
| 2006/0158399 A1* | 7/2006 | Kimura | G09G 3/3258 345/77 |
| 2006/0187415 A1* | 8/2006 | Slobodin | H04N 9/3167 353/31 |
| 2007/0024824 A1* | 2/2007 | Damera-Venkata | H04N 9/317 353/94 |
| 2007/0133087 A1* | 6/2007 | Widdowson | G03B 21/56 359/443 |
| 2010/0097449 A1* | 4/2010 | Jeong | H04N 13/359 348/59 |
| 2011/0205259 A1* | 8/2011 | Hagood, IV | G09G 3/3413 345/690 |
| 2012/0075536 A1* | 3/2012 | Uehara | G09G 3/2081 348/731 |
| 2012/0154455 A1* | 6/2012 | Steyn | G09G 3/3433 345/690 |
| 2012/0212486 A1* | 8/2012 | Van Der Horst | H04N 13/317 345/419 |
| 2012/0262544 A1* | 10/2012 | Damera-Venkata | H04N 13/337 348/43 |
| 2013/0021226 A1* | 1/2013 | Bell | G02B 27/017 345/8 |
| 2013/0022222 A1* | 1/2013 | Zschau | G03H 3/00 381/306 |
| 2013/0057159 A1* | 3/2013 | Pijlman | H04N 13/354 315/154 |
| 2013/0107145 A1* | 5/2013 | Ueki | G02C 7/101 349/13 |
| 2013/0147777 A1* | 6/2013 | Lau | G09G 3/346 345/207 |
| 2013/0286053 A1* | 10/2013 | Fleck | G09G 5/377 345/690 |
| 2013/0293598 A1* | 11/2013 | Ishihara | G09G 3/3607 345/690 |
| 2013/0300637 A1* | 11/2013 | Smits | G02B 5/128 345/8 |
| 2013/0321477 A1* | 12/2013 | Gandhi | G09G 3/2022 345/690 |
| 2014/0043353 A1* | 2/2014 | Ishihara | G09G 3/3426 345/589 |
| 2014/0049573 A1* | 2/2014 | Ishihara | G09G 3/3426 345/691 |
| 2014/0085274 A1* | 3/2014 | Lewis | G09G 3/3433 345/204 |
| 2014/0118829 A1* | 5/2014 | Ma | G02B 27/0172 359/567 |
| 2014/0140653 A1* | 5/2014 | Brown | G02B 27/0172 385/10 |
| 2014/0168034 A1* | 6/2014 | Luebke | H04N 13/339 345/8 |
| 2014/0254007 A1* | 9/2014 | Ma | G02B 30/27 359/464 |
| 2015/0015599 A1* | 1/2015 | Yaras | G09G 3/2037 345/600 |
| 2015/0085259 A1* | 3/2015 | Schreiber | G02B 27/0101 353/30 |
| 2015/0091932 A1* | 4/2015 | Buckley | G06T 11/001 345/589 |
| 2015/0194101 A1* | 7/2015 | Yaras | G09G 3/3433 345/593 |
| 2015/0262424 A1* | 9/2015 | Tabaka | G02B 27/0075 345/633 |
| 2015/0382465 A1* | 12/2015 | Steyn | H05K 3/305 361/783 |
| 2016/0174174 A1* | 6/2016 | Chae | H04W 52/0219 370/350 |
| 2016/0327798 A1* | 11/2016 | Xiao | G06T 19/006 |
| 2016/0343315 A1* | 11/2016 | Richards | G02B 27/017 |
| 2017/0031435 A1* | 2/2017 | Raffle | G02B 27/017 |
| 2017/0039960 A1* | 2/2017 | Jepsen | G02B 3/0062 |
| 2017/0061838 A1* | 3/2017 | Shi | G09G 3/3426 |
| 2017/0075421 A1* | 3/2017 | Na | G06F 3/013 |
| 2017/0091549 A1* | 3/2017 | Gustafsson | G02B 27/017 |
| 2017/0139211 A1* | 5/2017 | Trail | G02B 19/0004 |
| 2017/0139213 A1* | 5/2017 | Schmidtlin | G02B 27/30 |
| 2017/0262054 A1* | 9/2017 | Lanman | G02B 27/0068 |
| 2017/0272739 A1* | 9/2017 | Kroon | H04N 13/305 |
| 2017/0293148 A1* | 10/2017 | Park | G02B 27/0172 |
| 2017/0336626 A1* | 11/2017 | Hayashi | G02B 27/0093 |
| 2018/0003999 A1* | 1/2018 | Minano | G02B 3/0037 |
| 2018/0045860 A1* | 2/2018 | Kawanishi | G02B 3/0068 |
| 2018/0227540 A1* | 8/2018 | Stolitzka | G09G 3/2003 |
| 2018/0255563 A1* | 9/2018 | Chen | H04W 72/12 |
| 2018/0270722 A1* | 9/2018 | Kim | H04W 72/10 |
| 2019/0037555 A1* | 1/2019 | Kim | H04W 72/0413 |
| 2019/0103951 A1* | 4/2019 | Park | H04L 1/0061 |
| 2019/0116608 A1* | 4/2019 | Kim | H04W 72/1263 |
| 2019/0174384 A1* | 6/2019 | Kim | H04W 36/0069 |
| 2019/0304390 A1* | 10/2019 | Leroux | G09G 3/2085 |
| 2019/0318706 A1* | 10/2019 | Peng | G02B 26/08 |
| 2019/0327012 A1* | 10/2019 | Park | H04W 24/08 |
| 2020/0077434 A1* | 3/2020 | Kim | H04W 4/46 |
| 2020/0204789 A1* | 6/2020 | Minano | G02B 3/0006 |

OTHER PUBLICATIONS

Magoz et al., "Systems & Methods for Generating Temporally Multiplexed Images", U.S. Appl. No. 16/190,776 dated Nov. 14, 2018, 88 pages.

Sears, Jasmine Soria, "Apparatus, Systems, and Methods to Compensate for Sub-Standard Subpixels in an Array", U.S. Appl. No. 16/357,853 dated Mar. 19, 2019, 102 pages.

* cited by examiner

SYSTEMS AND METHODS FOR TRANSFERRING AN IMAGE TO AN ARRAY OF EMISSIVE SUB PIXELS

BACKGROUND

Emissive arrays produce images made up of many pixels. Such arrays commonly control the color and brightness of each pixel to present an image. A pixel is in turn often composed of multiple subpixels that emit light of differing spectral distributions. Due to its small size, a human eye typically does not perceive a subpixel individually. Instead, the eye blends the light emitted from the subpixels, producing the impression of a single source of light, the pixel. The color and brightness of a pixel may be controlled by varying the brightness of the underlying subpixels. For example, the underlying subpixels may produce a white pixel by illuminating with equal intensity. The underlying subpixels may produce different pixel colors by changing their relative brightness. The size of the single uniform pixel, which determines the resolution of an array, is typically equal to the sum of the sizes of its constituent subpixels and or the smallest feature that an array may visually resolve.

Subpixel array manufacturers commonly configure subpixels to emit light with the primary colors of red, blue, or green. These three colors may be combined to span a range of perceivable colors while minimizing the size of a pixel. However, such pixels are often unable to reproduce colors with a wavelength greater than that of the red subpixel or a wavelength less than that of the blue subpixel. An array may produce colors outside of these color ranges using additional subpixels, at the cost of increasing the individual pixel size and loss of resolution, unless the subpixel sizes were to shrink beyond what is currently available.

SUMMARY

As will be described in greater detail below, the instant disclosure generally relates to systems and methods for transferring an image to a subpixel array. In some embodiments, images may be divided according to subpixel intensity levels. In some embodiments, a set of subframes may be generated from an image and the subframes may then be transferred to a display device such as a subpixel array in a time-multiplexed fashion. The subframes may be processed further after transfer and prior to being sent to the subpixel array. In alternative or additional embodiments, the image may be reconstructed either in memory from the subframes, or a sequence of these subframes may be presented in such a manner to the viewer who perceives a single image.

In one example, a computer-implemented method for transferring an image including a range of intensities to a subpixel array may include, generating a set of subframes in which each subframe contains a fraction of the range of intensities of the image. In some embodiments, the bit-depth of the subframes may be reduced from the bit-depth of the image. The computer-implemented method may include (1) receiving image data for an image at a first location, the image data including a set of intensities distributed in one or more channels, (2) processing the image data into subframe data for a plurality of subframes, wherein subframe data for each subframe of the plurality of subframes includes a fractional range of intensities that are a subset of the set of intensities of the image data, (3) transferring the subframe data for the plurality of subframes to a second location, and (4) temporally multiplexing the plurality of subframes generated from the subframe data to reconstitute the image in a viewing region, wherein each of a plurality of subpixels of the image displayed in the viewing region is formed by light from two or more separate emissive subpixels of an emissive array during two or more subframes of the plurality of subframes.

In some embodiments, the plurality of subframes may be temporally multiplexed using an optical system (1) receives light from at least one of a plurality of subpixels of an emissive array, (2) laterally shifts the received light by a light deviator that is movable between a plurality of positions corresponding to one or more lateral-light-shifting degrees of freedom, each of the plurality of subframes corresponding to a different predetermined position of the light deviator, and (3) direct the laterally shifted light toward the viewing region In some examples, subframe data for each subframe of the plurality of subframes may include a unique fractional range of intensities of the subset of the set of intensities of the image data. Alternatively or additionally, the subframe data for the plurality of subframes may also be generated based on one or more channels. In some embodiments, the channels may each correspond separate colors and/or combinations of colors in the image. In one example, the method may further include transferring subframe data for a set of subframes of the plurality of subframes to the second location, wherein the subframe data for the set of subframes is specific to a channel or combination of channels of the one or more channels of the image data. According to various examples, each subframe of the set of subframes may be specific to a channel or a combination of channels and may include a dimensional size at the first location that includes only a portion of the image that is specific to the channel or the combination of channels. In at least one example, each subframe of the set of subframes at the second location may either be expanded to a dimensional size of the image and co-added with one or more additional subframes or may be unchanged in dimensional size. In various examples, the plurality of subframes may include four or more subframes.

In another example, the method may also include processing the image data to determine a set of relative frequencies of intensities from the subset of the set of intensities of the image data, wherein each subframe of the plurality of subframes has a fractional range of intensities determined from the set of relative frequencies of intensities. For example, the frequency of intensities may be determined, for example, using a histogram of the number of subpixels at a certain intensity, and the fractional ranges of the subframe data for each of the plurality of subframes may be determined by the structure of that histogram.

In some examples, the intensities of the image data, or subsets of these intensities, may be mathematically processed so as to reduce the bit-depth of subframe data for individual subframes of the plurality of subframes. For example, the method may further include compressing at least a subset of the set of intensities of the image data at the first location. Examples of mathematical processing include a zero-point offset, and/or scaling of the intensities, and/or compressing the intensities of the subframe data for each of the subframes in the plurality of subframes. In at least one example, a minimum value for the fractional range of intensities of the subframe data for each subframe may be reduced to zero by a zero-point offset that is used to restore the minimum value of the subframe data for that subframe at the second location.

In some examples, the size of a set subframes may be specific to a channel or color. In some images, red, blue, and green (RBG) data may be present, which RBG data may be of an equal size. In some images, there may be twice as many green subpixels as there may be either red or blue subpixels. By selecting only a specific color, the subframe for that color may not need to be the same size as that of the original image. It may be reduced in size, thus facilitating the transfer of the subframe data for that subframe from a first location to a second location. There may be a precise, and well-known, mapping between each element of the subframe data for a subframe and a particular subpixel in the original image, and the data in the reduced-sized subframe may then be mapped back into another larger subframe ready for display or, alternatively, the display circuitry may have the ability to take the reduced-size directly, without expanding the file size to the array size.

In some examples, subframe data for a special subframe may be generated, the values of the elements of the subframe data for that special subframe defining a particular type of transformation of the image intensities that may be placed into the elements of the associated subframe. For example, a zero in an element of the subframe data for the special subframe may indicate that no action is to be taken for that particular value of the intensity data; a value of 1, 2, or 3 may mean, for example, that a special processing occurs, where the different values indicate different processing algorithms for that particular element of the associated subframe. Such processing algorithms may include zero-point shifts, renormalization of intensity data for the associated subframe to be within a predetermined bit-depth of that associated subframe, or more complex algorithms such as data compression. Thus, each element of the subframe data for the associated subframe might have one of four different transformations to undergo in order to restore the original intensity level. These transformations may occur prior to transfer from a first location to a second location, and the reverse transformation may occur at the second location and before the subframe data is sent to the display. In some examples, each of a plurality of subpixels of the image displayed in the viewing region may be formed by light from two or more separate subpixels of the emissive array laterally shifted by the light deviator during two or more subframes of the plurality of subframes.

In one embodiment, a display system for implementing the above-described method may include (1) a receiver module, stored in memory, that receives image data for an image at a first location, the image data including a set of intensities distributed in one or more channels, (2) a subframe module, stored in memory, that processes the image data into subframe data for a plurality of subframes, wherein subframe data for each subframe of the plurality of subframes includes a fractional range of intensities of a subset of the set of intensities of the image data, (3) an emissive array including a plurality of emissive subpixels, (4) a multiplexing module, stored in memory, that temporally multiplexes the plurality of subframes generated from the subframe data to reconstitute the image in a viewing region, wherein each of a plurality of subpixels of the image displayed in the viewing region is formed by light from two or more separate emissive subpixels of the emissive array during two or more subframes of the plurality of subframes, and (5) at least one processor configured to execute the receiver module, the subframe module, the transfer module, and the multiplexing module. The display system may also include (1) an optical system that (i) receives light from at least one of the plurality of subpixels, (ii) laterally shifts the received light by a light deviator that is movable between a plurality of positions corresponding to one or more lateral-light-shifting degrees of freedom, each of the plurality of subframes corresponding to a different predetermined position of the light deviator, and (iii) directs the laterally shifted light toward the viewing region.

In one embodiment, a display system may include (1) an emissive array including a plurality of emissive subpixels and (2) a data input circuit. The data input circuit may be configured to (1) receive subframe data for a plurality of subframes, each of the plurality of subframes corresponding to a different predetermined position of the light deviator, wherein the subframe data for each subframe of the plurality of subframes includes a plurality of subframe elements, wherein each subframe element includes a value, (2) process the subframe data for the plurality of subframes, wherein the values of the plurality of subframe elements are converted into an array of intensities including a plurality of intensity elements, and (3) for each intensity element in the array of intensities: (i) map each intensity element to a corresponding subpixel in the plurality of subpixels of the emissive array, (ii) convert the intensity of each intensity element into one or more illumination parameters for the corresponding subpixel, and (iii) cause each subpixel of the emissive array to be illuminated using the one or more corresponding illumination parameters. Each of a plurality of subpixels of an image displayed in a viewing region may be formed by light from two or more separate emissive subpixels of the emissive array during two or more subframes of the plurality of subframes. In some examples, the display system may include an optical system that (i) receives light from at least one of the plurality of subpixels, (ii) laterally shifts the received light by a light deviator that is movable between a plurality of positions corresponding to one or more lateral-light-shifting degrees of freedom, each of the plurality of subframes corresponding to a different predetermined position of the light deviator, and (iii) directs the laterally shifted light toward a viewing region.

In some embodiments, the emissive array may include at least three channels and the plurality of subframes may include at least three subsets of subframes, and each of the at least three subsets of subframes may include each of the at least three channels. In at least one example, converting the intensity of each intensity element into one or more illumination parameters for the corresponding subpixel may include at least one of a zero-point shift, a scaling, or a decompression.

Features from any of the embodiments disclosed herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
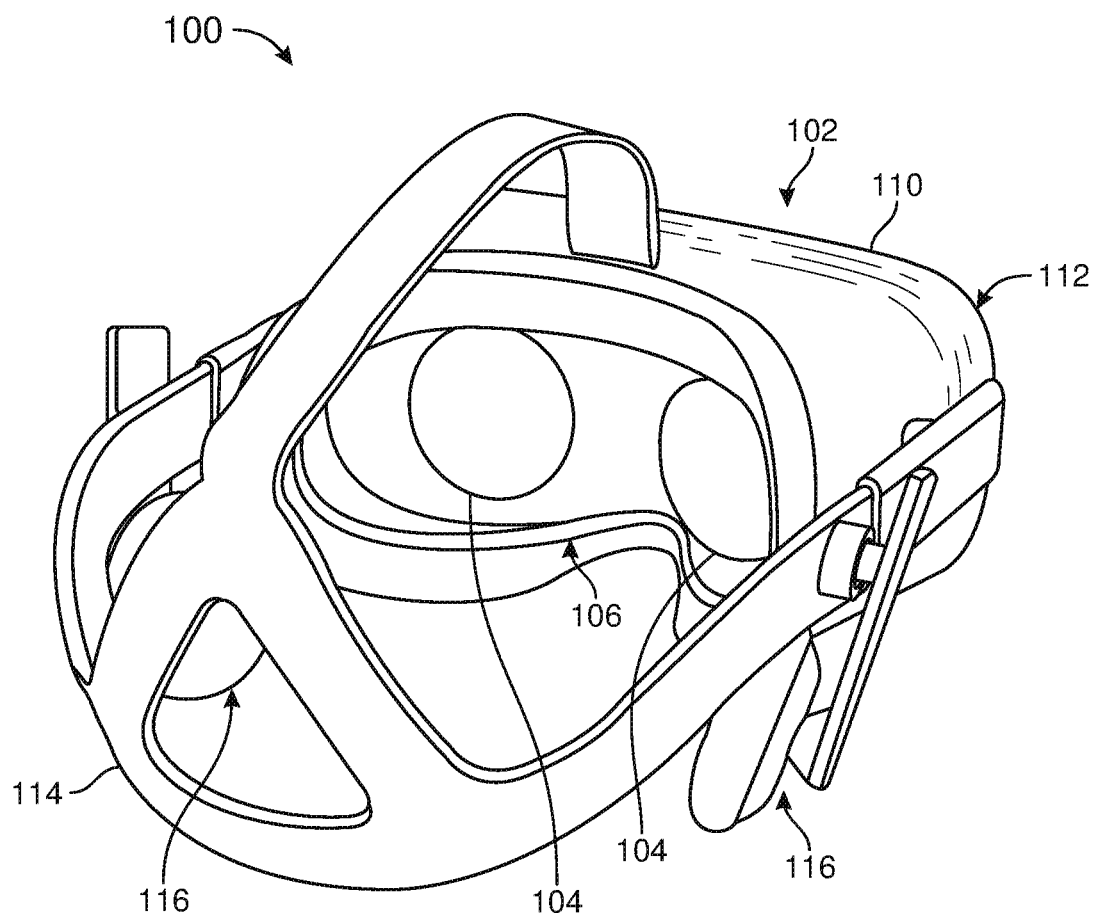
FIG. 1 is a perspective schematic of an example head-mounted display (HMD), in accordance with one or more embodiments disclosed herein.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and may be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to apparatus, systems, and computer-implemented methods for transferring an image or input data to an array of subpixels. As will be explained in greater detailed below, embodiments of the instant disclosure may include receiving an image or input data at a first location, processing the image or input data into subframes, in which the subframes include a fraction of the intensities of the image, transferring the subframes to a second location, which may be an array, or a component of an array system such as the array circuitry, and temporally multiplexing the array to a viewer. The disclosed embodiments may facilitate a faster transfer of information contained in the image than by transferring the image itself. The transferred subframes, which may be temporally multiplexed to an array, may allow the image or input data to be perceived by the viewer.

Figure 2:
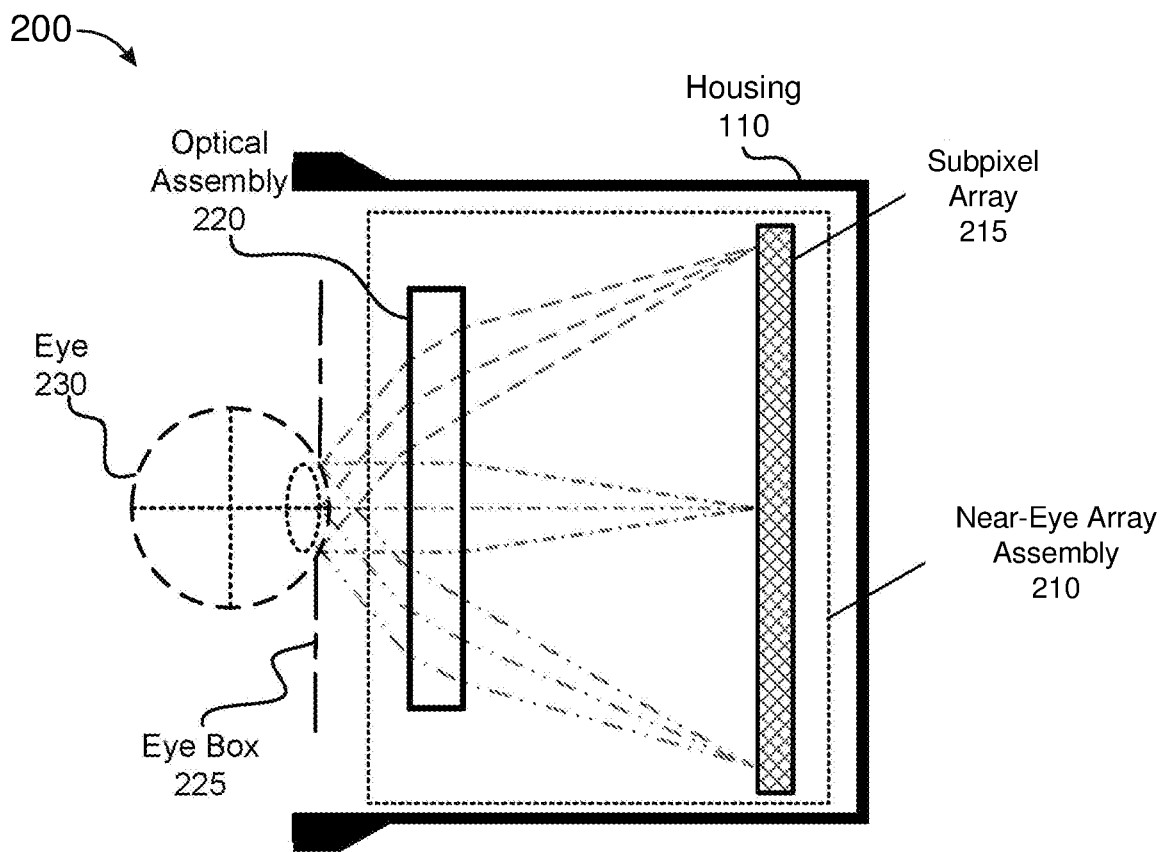
FIG. 2 is a cross-sectional schematic of a portion of a front section of an example HMD in accordance with some embodiments.
Figure 3A:
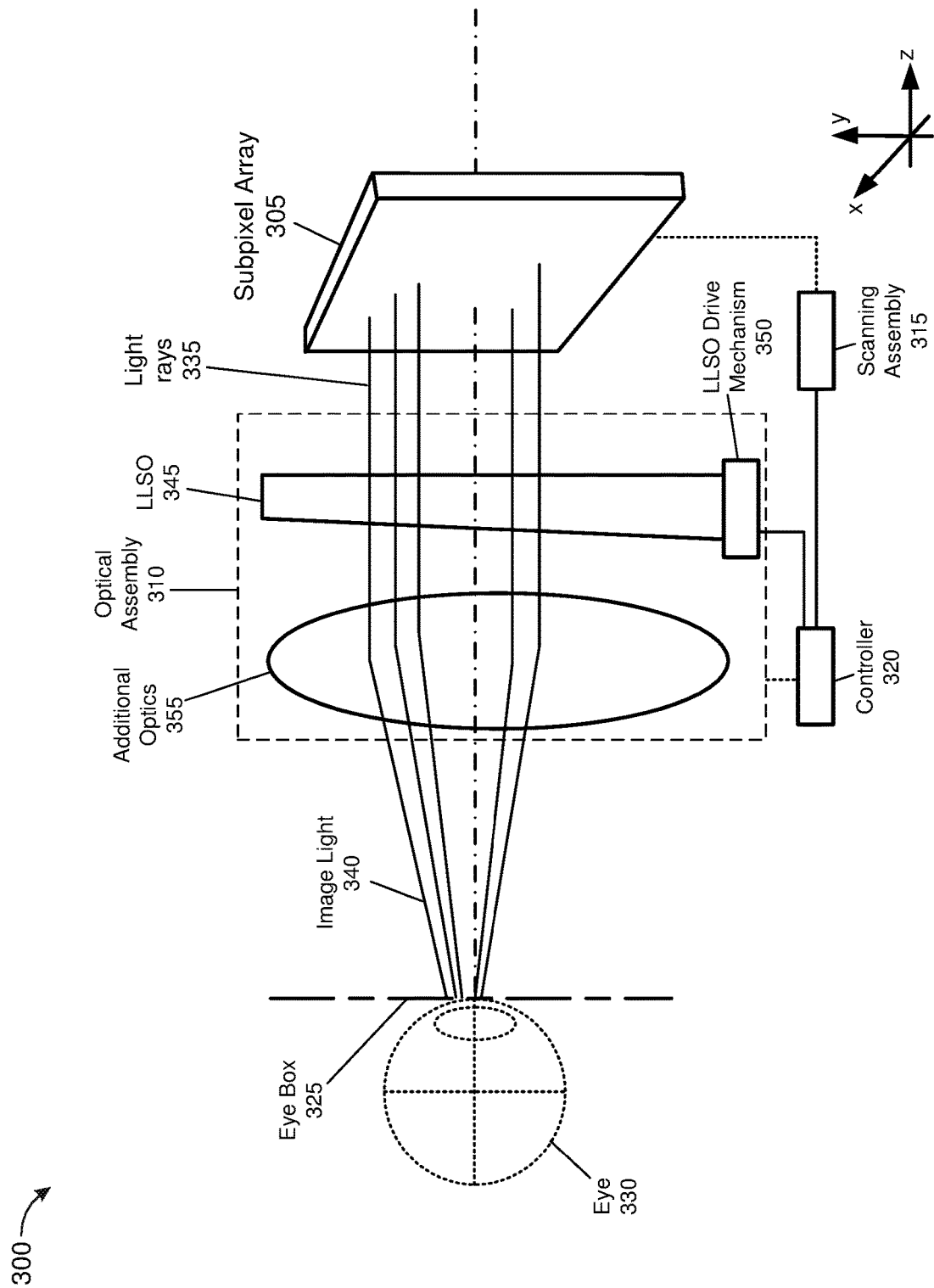
FIG. 3A is a diagram that depicts a portion of an example near-eye array assembly, in accordance with some embodiments.
Figure 3B:
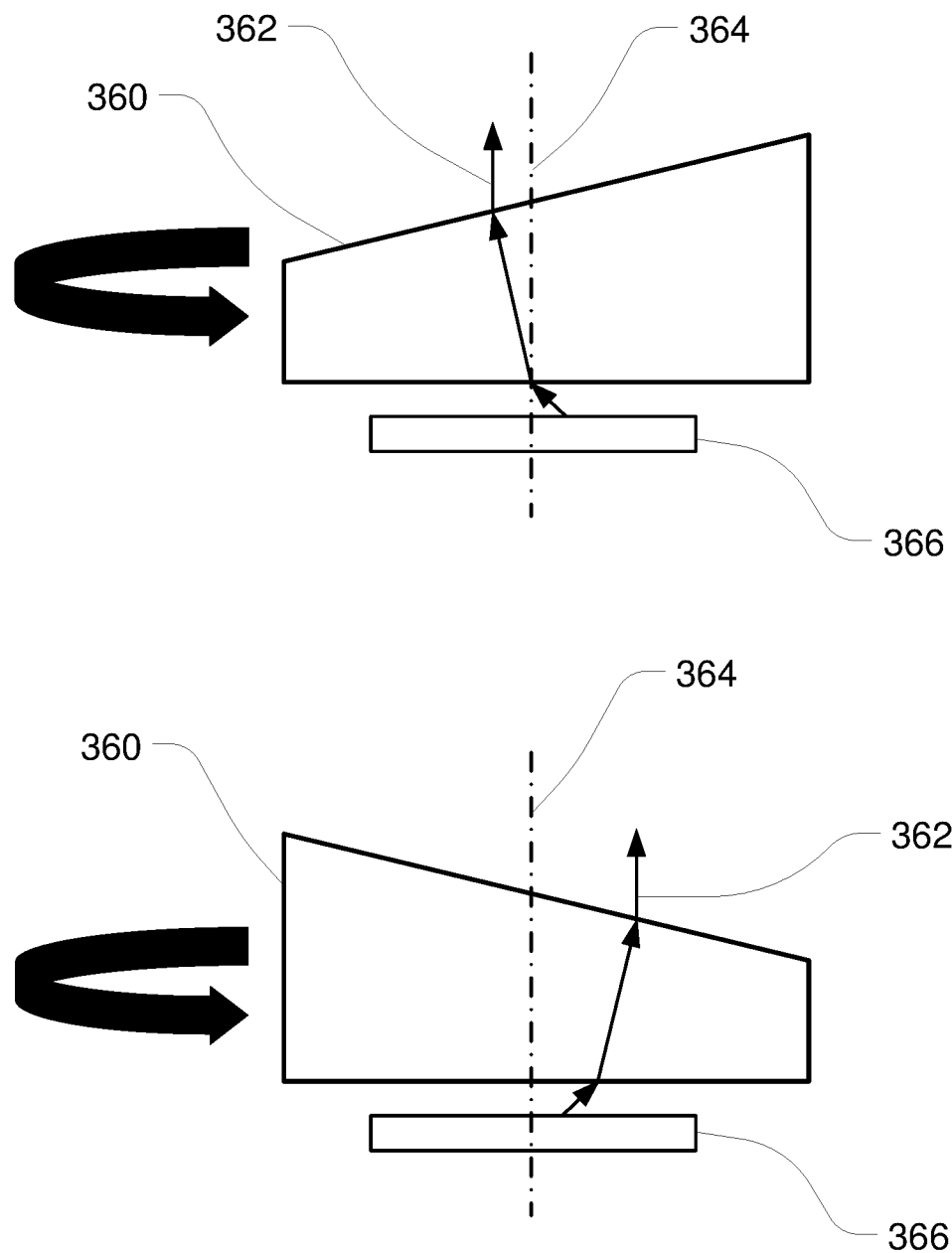
FIG. 3B is a cross-sectional side view of an example lateral-light-shifting optic (LLSO, light deviator) for altering a light path disposed over a light-emitting region, in accordance with some embodiments.
Figure 3C:
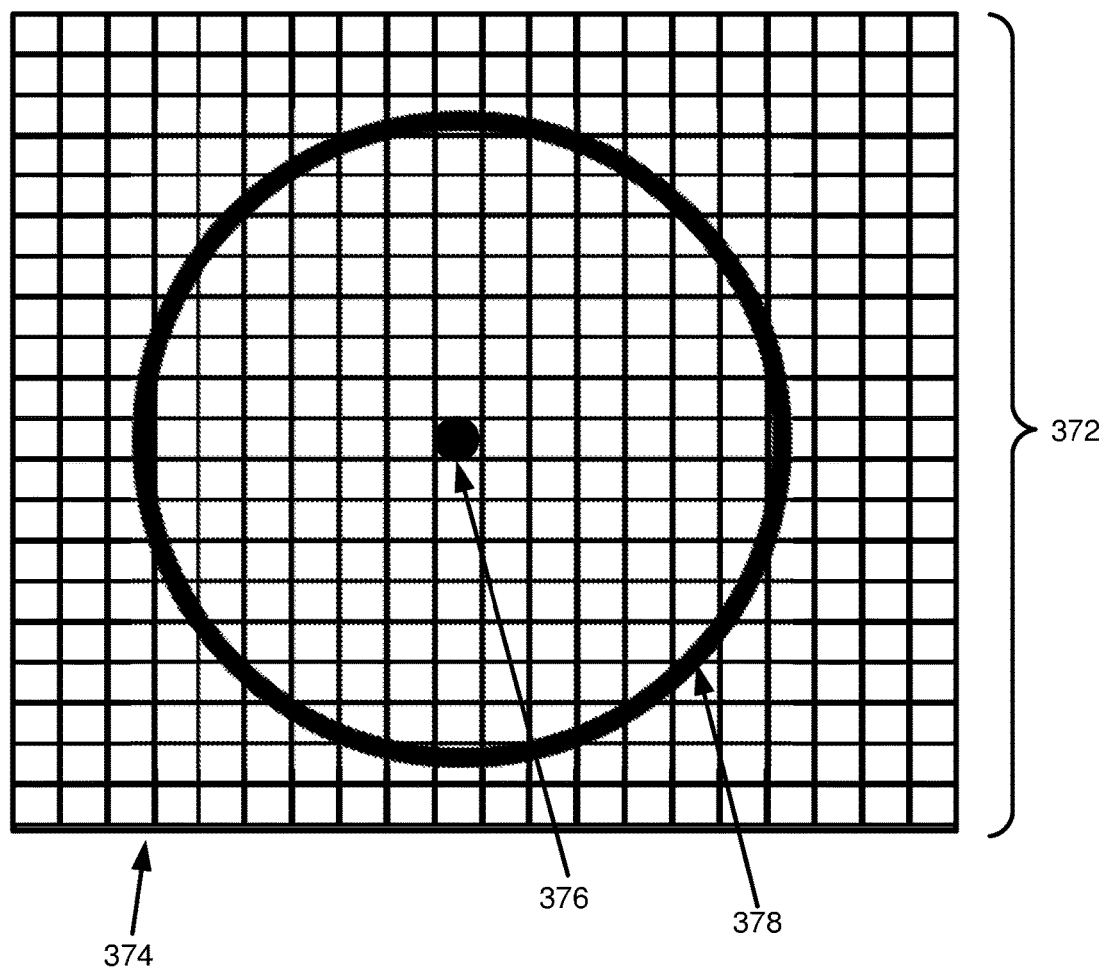
FIG. 3C is view of an exemplary array of subpixels demonstrating lateral translation of light by an LLSO (i.e., light deviator), in accordance with some embodiments.
Figure 4:
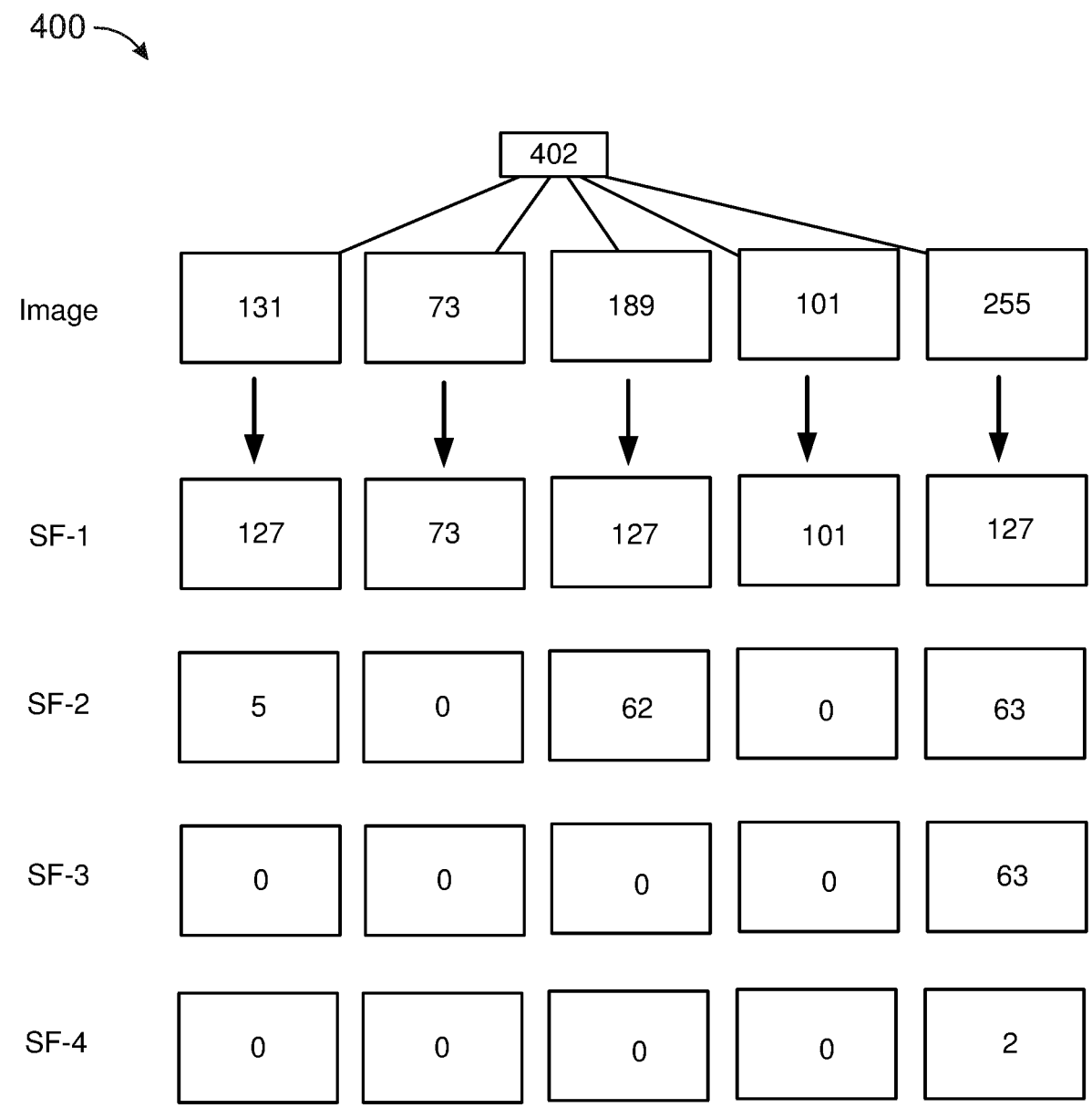
FIG. 4 is a diagram illustrating an example of dividing image data into subframes, in accordance with some embodiments.
Figure 5:
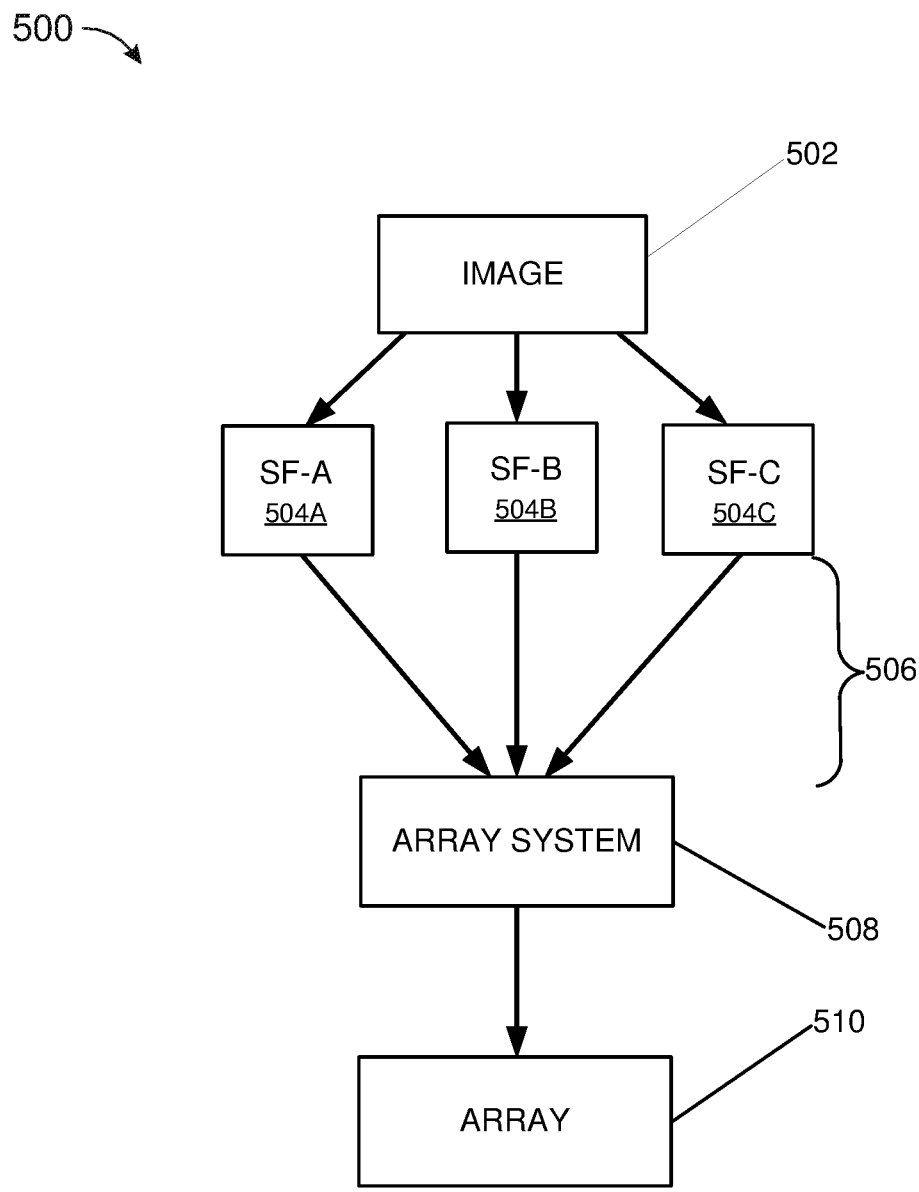
FIG. 5 is a flow diagram demonstrating example steps to divide image data into subframes and forward them to a display system, in accordance with some embodiments.
Figure 6:
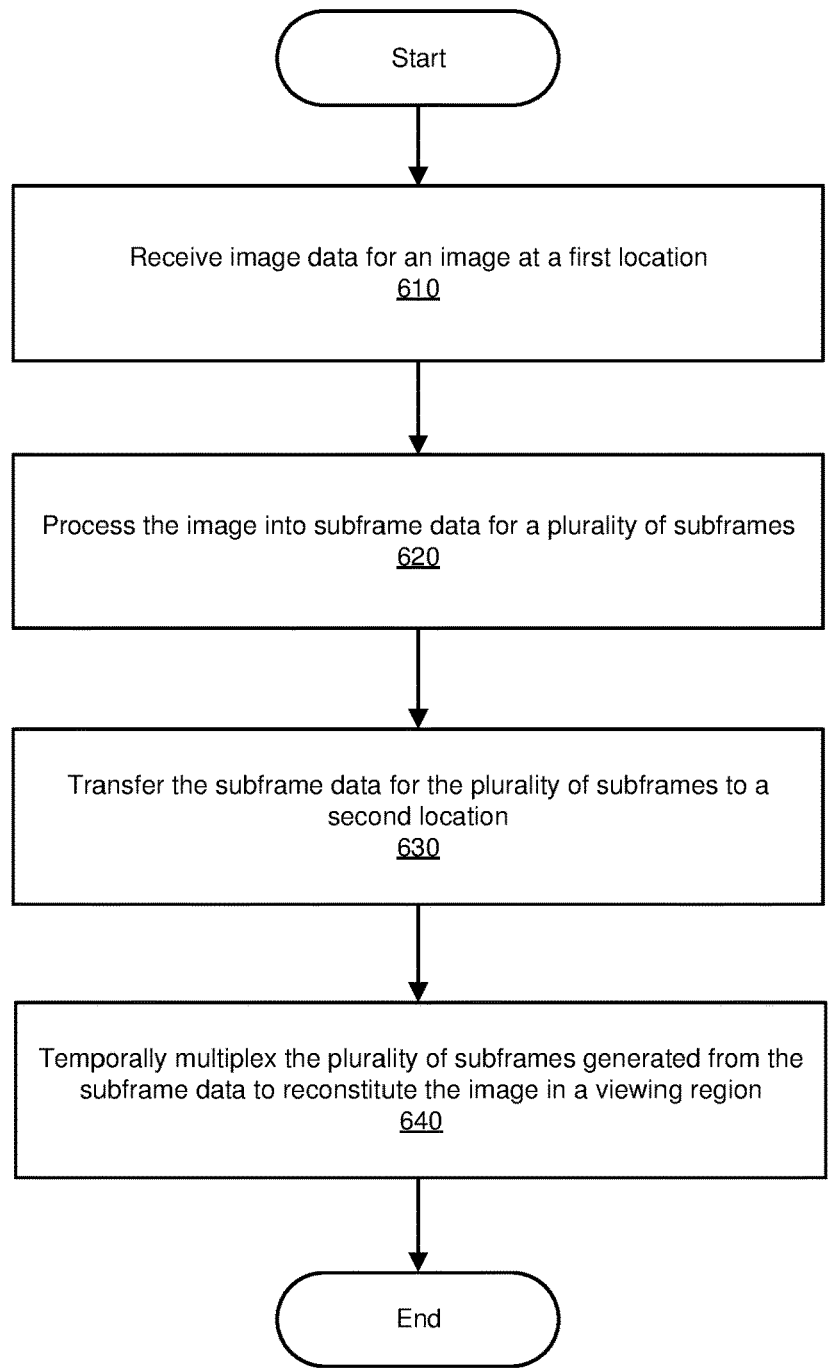
FIG. 6 is a flow diagram of an example method for transferring an image to an array of subpixels, in accordance with some embodiments.

The following will provide, with reference to FIGS. 1-7, detailed descriptions of the systems and computer-implemented methods that are disclosed to accelerate the transfer of input or image data to an array system. FIGS. 1-3C provide an example of the environment in which the transfer of image data by separate subframes may occur, namely that of a head-mounted display system. FIG. 4 illustrates dividing image data into subframes, in accordance with some embodiments. FIG. 5 presents an example of a method to divide an image into a set of subframes and forward these to a display system. FIG. 6 illustrates, in an example, a flow diagram of transferring an image, using its subframe representations, and presenting the data to an array system to be displayed by an array of subpixels. In some embodiments, multiple displays or array systems of subpixels may be present.

In some embodiments, one or more arrays of subpixels may be utilized in a combination with a computing device. The subpixel arrays may be used in, for example, an external monitor, a built-in monitor, a game array, a head-mounted display (HMD), or other array using colored subpixels and where individual pixels and/or subpixels may be separately operable to emit light. The array of subpixels may include a subpixel layout that may include at least a plurality of subpixel types of three or more different colors arranged in selected linear paths, circular or substantially circular paths, and/or any other suitable paths (e.g., rectangular paths, square paths, hexagonal paths, etc.). In some embodiments, a subpixel array may include a light-emitting layer and a color selector layer (e.g., a color filter layer, a color converting emissive layer, etc.) that may be moved parallel relative to the light-emitting layer by an actuator.

The described subframes and arrangements of subpixel arrays may allow for spatial and/or temporal pixel or subpixel averaging. Each pixel may include subpixels that may be operable to emit a white light when illuminated concurrently. Each color of a subpixel may lie on a circular path such that a circular translation may allow each color subpixel to appear in the same location. In some examples, a pixel or subpixel at one physical location on the array may seem to a viewer to originate from a different array location, while the array remains stationary.

Embodiments of the present disclosure may include or be implemented in conjunction with an artificial reality system. Artificial reality is a form of perceived reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that may be used to, e.g., create content in artificial reality and/or may be otherwise used (e.g., perform activities) in artificial reality.

An artificial reality system that provides the artificial reality content may be implemented on various platforms, including a head-mounted array (HMD) connected to a host computer system, a standalone HMD such as the one depicted in FIG. 1, a mobile device, or computing system, or any other hardware platform capable of providing artificial reality content to one or more viewers. Emerging applications require higher resolution of subpixel arrays, faster frame-rates, smaller total size, lighter weight, lower-power, larger color gamut, etc.

FIG. 1 is a perspective view of an HMD 100, in accordance with one or more embodiments disclosed herein. The HMD 100 may be part of an artificial reality system. In embodiments that describe an augmented-reality system and/or a MR system, portions of an HMD device 102 of the HMD 100 may be at least partially transparent in the visible band (380 nm to 750 nm), and portions of the HMD 100 that may be between the HMD device 102 of the HMD 100 and an eye of the user may be at least partially transparent (e.g., a partially transparent array).

In some embodiments, HMD 100 may include an HMD device 102, a strap subsystem 114, and audio subsystems 116. HMD device 102 may include any type or form of array device or system that is worn on or about a user's head and projects visual content to the user. HMD device 102 may project content in any suitable manner, including via a screen (e.g., a liquid crystal array (LCD) or a light-emitting diode (LED) screen), a projector, a cathode ray tube, an optical mixer, etc. HMD device 102 may project content in one or more of various media formats. For example, HMD device 102 may project videos, photos, and/or computer-generated imagery (CGI). HMD device 102 may include a housing 110 surrounding components of HMD device 102, including lenses 104 and various structural, mechanical, and electronic components, including array components as described herein. Housing 110 may define an opening surrounding a viewing region 106 configured to surround a portion of a user's face and field-of-view. Additionally, housing 110 may include a front-facing portion 112 disposed away from viewing region 106 and side surfaces extending from front-facing portion 112 and surrounding the internal components of HMD 102.

FIG. 2 is a cross-sectional view 200 of the HMD device 102 of the HMD 100 shown in FIG. 1, in accordance with one or more embodiments. As shown in FIG. 2, the HMD device 102 may include a housing 110 that houses a near-eye array assembly 210 that may include a subpixel array 215 and an optical assembly 220. The near-eye array assembly 210 may be so constructed herein to increase resolution and/or brightness of light output by the near-eye array assembly 210, e.g., by rapidly moving the subpixel array 215 and/or one or more components of the optical assembly 220. In some embodiments, the near-eye array assembly 210 may include a two-dimensional subpixel array 215 that operably emits light being collimated by a lens system of the optical assembly 220 (not shown in FIG. 2). However, other architectures of the near-eye array assembly 210 may be possible. The subpixel array 215 and the optical assembly 220 together provide light to an eye box 225. The eye box 225 is a region in space that is occupied by a user's eye 230. For purposes of illustration, FIG. 2 shows a cross-section 200 associated with a single eye 230, but another optical assembly 220, separate from the optical assembly 220, provides altered light to the other eye of the user. The subpixel array 215 may emit light toward the optical assembly 220. In various embodiments, the subpixel array 215 may include a single array or multiple arrays (e.g., a subpixel array or multiple arrays for each eye of a user). Examples of the subpixel array 215 may include: a liquid crystal array (LCD), an organic light emitting diode (OLED) array, an inorganic light emitting diode (ILED) array, an active-matrix organic light-emitting diode (AMOLED) array, a transparent organic light emitting diode (TOLED) array, an array of quantum dots or of quantum rods, some other array, a projector, or some combination thereof. In some examples, subpixel array 215 may include or may be utilized with a backlit system in which the light to each subpixel may be provided by one or more lasers and a laser-light-to-subpixel distribution system such as one or more MEMS arrays.

In some embodiments, the near-eye array assembly may be incorporated into an HMD, such as HMD 100 of FIG. 1. The HMD may project content to a user wearing the HMD. The HMD may be part of an artificial reality system. The array of the near-eye array assembly may be configured to emit light. The optical assembly of the array assembly may be further designed to direct the light to an eye box of the HMD corresponding to a location of a user's eye.

A near-eye array assembly presented in this disclosure, such as the example presented in FIG. 2, and may include a subpixel array 215, an optical assembly 220, the latter of which may include a scanning assembly. The subpixel array 215 may be configured with a subpixel array operable to emit light. The optical assembly 220 may be configured to provide optical correction to the light, in the form of a lateral shift in the direction of the light, and then direct the light toward an eye box 225 of a user's eye 230. An eye box 225 may be defined as a region where an entrance pupil of a human eye may be located to perceive an acceptable quality image produced by the downstream viewing optics. In some embodiments, the subpixel array 215 and/or optical assembly 220 may be moved rapidly, e.g., by the scanning assembly, to increase resolution and/or brightness of the light output by the near-eye array assembly. The subpixel array 215 may include several components collectively referred to as the array system. Such components may be the emissive array itself, in addition to the circuitry which allows control of the individual subpixels and any other functions of the array. An additional component may include storage media, which may be used, in some embodiments, for temporary storage of subframes prior to being engaged to illuminate the specified sets of emissive subpixels.

A subpixel array 215, which may be densely-populated, and/or one or more components of the optical assembly 220 optically coupled to the array, may be moved in a manner such that light from a given subpixel overlays light from another subpixel, thereby causing each subpixel location to function as a subpixel of the same size enhancing a perceived array resolution at the eye box. Accordingly, the light from one pixel or subpixel may be optically manipulated to appear to a viewer as if the light originated at a different location.

In some embodiments, the near-eye array assembly may be incorporated into an HMD (see, e.g., FIGS. 1 and 2). The HMD may project content to a user wearing the HMD. The HMD may be part of a virtual or artificial reality system. The array of the near-eye array assembly may be designed to emit light. The optical assembly of the array assembly may be further configured to direct the light to an eye box of the HMD corresponding to a location of a user's eye.

The subpixel array 215 may also include an aperture, a Fresnel lens, a convex lens, a concave lens, a diffractive element, a waveguide, a filter, at least one polarizer, a diffuser, a fiber taper, a reflective surface, a polarizing reflective surface, or any other suitable optical element that affects the light emitted from the subpixel array 215. In some embodiments, the subpixel array 215 may have one or more coatings, such as anti-reflective coatings. More details about architecture of the subpixel array 215 and operation of the subpixel array 215 within the near-eye array assembly 210 are provided in conjunction with FIG. 3A.

The optical assembly 220 may receive light emitted from the subpixel array 215 and directs the light to the eye box 225 of the user's eye 230. The optical assembly 220 may also magnify the received light, correct optical aberrations associated with the light, and the corrected light may be presented to a user of the HMD 100. In some embodiments, the optical assembly 220 may include a collimation element (lens) for collimating beams of light emitted from the subpixel array 215. At least one optical element of the optical assembly 220 may be an aperture, a Fresnel lens, a refractive lens, a reflective surface, a diffractive element, a waveguide, a filter, and/or any other suitable optical element that affects light emitted from the subpixel array 215. Optical assembly 220 may also possess one or more refractive elements in the form of a lateral light-shifting optic configured with at least one mechanical degree of freedom to displace light laterally.

In some embodiments, the housing 110 may further include an eye tracking system (not shown in FIG. 2) that determines pupil tracking information for the user's eye 230. The determined eye tracking information may include information about a position (including orientation) of the user's eye 230 in the eye box 225, i.e., information about an angle of an eyegaze. In one embodiment, the eye tracking system may illuminate the user's eye 230 with structured and unseen light. The eye tracking system may use locations of the reflected structured light in a captured image to determine the position of the user's eye 230. In another embodiment, the eye tracking system may determine the position of the user's eye 230 based on magnitudes of light captured over a plurality of time instants.

In some embodiments, the housing 110 may further include a varifocal module (not shown in FIG. 2). The varifocal module may adjust focus of one or more images displayed on the subpixel array 215, based on the eye tracking information obtained from the eye tracking system. In one embodiment, the varifocal module may adjust focus of the displayed images and mitigates vergence-accommodation conflict by adjusting a focal distance of the optical assembly 220 based on the determined eye tracking information. In other embodiments, the varifocal module may adjust focus of the displayed images by performing foveated rendering of the one or more images based on the determined eye tracking information.

FIG. 3A illustrates additional detail of an example near-eye array assembly 300, in accordance with one or more embodiments. The near-eye array assembly 300 may be designed herein to increase resolution and/or brightness of light output by the near-eye array assembly 300. The near-eye array assembly 300 may include a subpixel array 305, an optical assembly 310, a scanning assembly 315 coupled to at least one or both of the subpixel array 305 and the optical assembly 310, and a controller 320 coupled to the scanning assembly 315. The near-eye array assembly 300 may be part of the HMD 100 in FIG. 1. Furthermore, the near-eye array assembly 300 may be part of an HMD implemented as an eyeglass-type platform. In this case, the subpixel array 305 of the near-eye array assembly 300 may be also implemented as a waveguide-based array.

The near-eye array assembly 300 may be an embodiment of the near-eye array assembly 210 in FIG. 2; the subpixel array 305 may be an embodiment of the subpixel array 215 in FIG. 2; and the optical assembly 310 may be an embodiment of the optical assembly 220 in FIG. 2. The subpixel array 305 may emit or may be operable to emit light, e.g., based in part on controller instructions from the controller 320. In one embodiment, the subpixel array 305 may be implemented as an OLED array. In another embodiment, the subpixel array 305 may include quantum dots or rods. In another embodiment, the subpixel array 305 may be implemented as an LED array. In additional embodiments, one or more lasers may illuminate subpixels from behind, and colored light may be produced by a linear combination of light from a plurality of lasers, or a single laser may excite specific phosphor coatings present in each subpixel. Additionally or alternatively, subpixel array 305 may be implemented as any suitable type of emissive display array, without limitation.

The optical assembly 310 may control a field of view (FOV) at an eye box 325 of an eye 330 and may direct a plurality of light rays 335 of light emitting from the subpixel array 305 toward the eye box 325. In general, the subpixel array 305 may be implemented herein to have a first resolution of pixels. In accordance with at least one embodiment, the scanning assembly 315 may be configured to shift directions of the light rays 335 in accordance with controller instructions (e.g., provided by the controller 320) such that a virtual array is projected to the eye box 325, wherein the virtual array (not shown in FIG. 3A) has a second resolution greater than the first resolution of the subpixel array 305. Thus, a resolution of image light 340 presented to the eye box 325 may be greater than that of the light rays 335. In addition, a level of brightness (intensity) of the image light 340 at the eye box 325 may be increased relative to a level of brightness of the light rays 335 being emitted from the subpixel array 305. In an exemplary embodiment, the scanning assembly 315 may be configured to shift a direction of at least one of the light rays 335 in accordance with the controller instructions, wherein the second resolution of the virtual array presented to the eye box 325 may be increased by at least one virtual pixel relative to the first resolution of the subpixel array 305.

In some embodiments, the optical assembly 310 may include one or more electro-optical elements, which are shown as additional optics 355 in FIG. 3A. In one or more embodiments, the one or more electro-optical elements of the optical assembly 310 may include one or more electro-optical liquid deformable surfaces. Operation of the one or more electro-optical elements in the optical assembly 310 may be controlled based in part on, e.g., controller instructions from the controller 320 to shift the directions of the light rays 335 emitted from the subpixel array 305 to increase resolution and/or brightness of the image light 340 at the eye box 325.

In some embodiments, the optical assembly 310 may include at least one LLSO 345 (see, e.g., an exemplary LLSO as shown in FIG. 3B). In one or more embodiments, as will be described in greater detail below, the LLSO 345 in the optical assembly 310 may be so configured as to rotate about an axis perpendicular to or tilted relative to the plane of the subpixel array 305. The rotation characteristics of the LLSO 345 (speed, location, etc.), the tilt, and/or the pivot of the LLSO 345 may be controlled based in part on, for example, the controller instructions from the controller 320.

By rotating or manipulating the LLSO 345 in the optical assembly 310 about an optical axis of the optical assembly 310 (e.g., based in part on the controller instructions from the controller 320), the directions of the light rays 335 emitted from the subpixel array 305 may be laterally translated with respect to an undeviated ray, thereby increasing resolution, brightness, and/or color of the projected image light 340 at the eye box 325. In some embodiments, the LLSO 345 may include two separate rotating LLSOs (light deviators), either co-rotating or rotating separately. Each LLSO or light deviator may be separately controlled by the controller 320 or sub-systems of the controller 320. In other embodiments, the LLSO 345 may be configured to tilt and/or to pivot. An LLSO drive mechanism 350 may perform the variety of motional conveyances to the LLSO 345, such as rotation, tilt, and/or pivot. The controller 320 may provide instructions to the drive mechanism 350 to orient the LLSO 345 in a specific position when light from given subpixels of the subpixel array 305 are instructed by the controller 320 to be emitted.

In some embodiments, the scanning assembly 315 may be designed to shift the directions of the light rays 335 emitted from the subpixel array 305 by rotationally and/or laterally shifting a relative position of the subpixel array 305 to the optical assembly 310 in accordance with the controller instructions (e.g., from the controller 320) at each time interval of a plurality of time intervals in a time period of scanning the subpixel array 305. The scanning assembly 315 may include at least one positioner coupled to the subpixel array 305 for rapidly moving the subpixel array 305 and/or at least one component (e.g., additional optics 355) of the optical assembly 310 along a lateral dimension during the scanning, thereby shifting the relative position of the subpixel array 305 to the optical assembly 310 and increasing resolution and/or brightness of light at the eye box 325. Additional optics 355, which are part of the optical assembly 310, may include optical components that direct the laterally shifted light emerging from the LLSO 345 towards the eye box 325. These additional optics 355 may be transmissive or reflective, or a combination of both.

In some embodiments, at least one positioner of the scanning assembly 315 may be implemented as a micro-actuator configured to move the subpixel array 305 and/or the at least one component of the optical assembly 310, based in part on, e.g., controller instructions from the controller 320, thereby increasing resolution and/or brightness of the projected image light 340 at the eye box 325. Such a micro-actuator might be a piezoelectric or magnetostrictive device.

Furthermore, in one embodiment, at least one positioner of the scanning assembly 315 may be designed to rotate, to tilt, or to pivot, or to reflect, or any combination of these movements, the at least one LLSO 345 of the optical assembly 310 about an axis of the optical assembly 310 (e.g., based in part on the controller instructions from the controller 320) to shift the directions of the light rays 335 emitted from the subpixel array 305, thereby increasing resolution and/or brightness of the projected image light 340 at the eye box 325.

In some other embodiments, the at least one positioner of the scanning assembly 315 may be configured to shift the subpixel array 305 and/or the at least one component of the optical assembly 310 and to rotate at least one other component of the optical assembly 310, such as LLSO 345, during a time period (or control in some other manner operation of the other component of the optical assembly 310), thereby shifting directions of the light rays 335 emitted from the subpixel array 305 and increasing resolution and/or brightness of the projected image light 340 at the eye box 325. The controller 320 may generate controller instructions for one or more components of the near-eye array assembly 300. The subpixel array 305 may emit the plurality of light rays in accordance with the controller instructions from the controller 320. In some embodiments, the controller 320 may be coupled, via the scanning assembly 315, to at least one of the subpixel array 305 and the optical assembly 310. Thus, the scanning assembly 315 may operate as an electrical or electro-mechanical interface between the controller 320 and at least one of the subpixel array 305 and the optical assembly 310.

In other embodiments, when the subpixel array 305 is implemented as a densely-populated array, the controller 320 may instruct, based in part on the controller instructions, the scanning assembly 315 to translate the subpixel array 305 and/or the optical assembly 310 linearly along orthogonal paths (i.e., lateral dimensions) using at least one positioner of the scanning assembly 315 to effectively shift the subpixel array 305 and/or the optical assembly 310 around in a circular path during a time period of translational movement. In this manner, the densely-populated subpixel array 305 may be presented at the at the eye box 325 as a virtual array having an increased subpixel/pixel resolution.

Furthermore, in an embodiment, the controller 320 may be configured to instruct the at least one positioner of the scanning assembly 315 to manipulate movements of the LLSO 345 within the optical assembly 310 about an axis of the optical assembly 310 to shift the directions of the light rays 335, based in part on the controller instructions, thereby increasing resolution and/or brightness of the projected image light 340 at the eye box 325. In another embodiment, the controller 320 may instruct the at least one positioner of the scanning assembly 315 to manipulate a collimation element of the optical assembly 310 about an axis of the optical assembly 310 to shift the directions of the light rays 335, based in part on the controller instructions, thereby increasing resolution and/or brightness of the projected image light 340 at the eye box 325.

In one or more embodiments, the controller 320 may directly interface with one or more components of the optical assembly 310 (e.g., one or more electro-optical liquid deformable surfaces). The controller 320 may be then configured to control operation of the one or more electro-optical elements in the optical assembly 310 based in part on the controller instructions to shift the directions of the light rays 335 emitted from the subpixel array 305, thereby increasing resolution and/or brightness of the projected image light 340 at the eye box 325. For example, the controller 320 may control, based in part on the controller instructions, a level of voltage applied to each electro-optical liquid deformable surface in the optical assembly 310 to change a refractive index of that surface and shift the directions of the light rays 335 emitted from the subpixel array 305. In other embodiments, the controller 320 may be configured to control, based in part on the controller instructions, operation of the scanning assembly 315 (e.g., of the at least one positioner in the scanning assembly 315) to control a brightness of a virtual pixel of the virtual array at the eye box 325, based on a number of times over a time period, a location at the eye box 325 corresponding to the virtual pixel receiving one or more light rays of the plurality of light rays 335 associated with a particular subpixel color emitted from the subpixel array 305.

Furthermore, in some embodiments, when the subpixel array 305 is implemented as a sparsely populated array, the controller 320 may instruct the at least one positioner of the scanning assembly 315 during a time period to control operation of at least one component (e.g., LLSO 345 and/or additional optics 355, such as a collimation element or electro-optical element) of the optical assembly 310 as well as to move rapidly the subpixel array 305 and/or at least one other component of the optical assembly 310 along a lateral dimension, based in part on the controller instructions. In this manner, the sparsely-populated subpixel array 305 may be presented at the at the eye box 325 as the virtual array having an increased subpixel/pixel resolution. An example of a sparsely-populated array would be a smart pixel array.

In other embodiments, when the subpixel array 305 is implemented as a densely-populated array, the controller 320 may instruct the at least one positioner of the scanning assembly 315 during the time period to control operation of at least one component (e.g., LLSO, collimation element, or electro-optical element) of the optical assembly 310 as well as to translate rapidly the subpixel array 305 and/or at least one other component the optical assembly 310 linearly along orthogonal paths to effectively shift the subpixel array 305 and/or the optical assembly 310 around in a circular path, based in part on the controller instructions. In this manner, the densely-populated subpixel array 305 may be presented at the at the eye box 325 as the virtual array having an increased subpixel/pixel resolution.

In some embodiments, for a multi-chromatic sparsely-populated subpixel array 305, the scanning may be sufficiently fast such that the eye 330 integrates light from three different neighboring subpixels of different color channels that occupy the same subpixel position in a cell at different time instants. The three different subpixels occupying the same subpixel position in the cell at different time instants may form a virtual RGB subpixel of the same size as a single-color-channel subpixel. In this manner, a virtual RGB subpixel representing a white pixel or other suitable color may be provided at a subpixel position of the sparsely-populated subpixel array 305. In some embodiments, for the sparsely-populated subpixel array 305, the eye 330 may integrate light from three different neighboring subpixels that occupy a single subpixel position in a pixel at different time instants such that a brightness of light emitted from the subpixel position is increased.

Subpixel arrays 215 and 305 may be designed to create colors having a wavelength between subpixels operably emitting the highest wavelength light and subpixels operably emitting the lowest wavelength light. Thus, combining light from subpixels with differing spectral properties may be used to produce a broad spectrum of colors visible to a viewer. In some examples, spatial subpixel averaging may produce colors visible to a user by using subpixels in close spatial proximity to enable a pixel to appear to emit a single, variable color.

In some embodiments, variable colors may be produced in a subpixel array using temporal subpixel averaging. Temporal subpixel averaging may produce colors visible to a user by emitting multiple colors of light from a single subpixel location at different moments in time in rapid succession. The human eye may perceive the rapidly changing colors as a single color emitted from the subpixel location. For example, if a subpixel location flashes red, green, and blue rapidly (e.g., as in temporal multiplexing), the human eye may perceive the subpixel as a white. In some embodiments, additional subpixels may be added to subpixel array 215 and/or 305 to increase the brightness and/or extend the color gamut of the subpixel array 215 and/or 305.

According to various embodiments, a subpixel layout designed for spatial subpixel averaging may include a dense packing of subpixels to maximize resolution. The subpixel layout may further vary the size and shape of subpixels to minimize the sum of the subpixel areas that make up a single pixel. Layout optimization for temporal subpixel averaging, as described herein, may result in very different subpixel layouts compared to spatial subpixel averaging. When optimizing for temporal subpixel averaging, a subpixel may be the same size, shape, and orientation as every other subpixel. This may allow for effective spatial overlap of subpixels through simple translation of the optical path or color-selecting layer, without the need for rotation or other transformations which require more complex mechanisms. In addition, straight lines may exist along which every subpixel color may be found with minimal unused space or repetition to allow full color overlap via translation along a single axis. For example, the linear path may be contiguous with one of each subpixel. In some examples, contiguous objects or regions may have a common border or may be adjacent or touching one another. For example, a contiguous path of subpixels may include each subpixel with no additional subpixels in the path between the subpixels. Similarly, circular paths, substantially circular paths, and/or other circuitous paths (e.g., rectangular paths, hexagonal paths, etc.) may exist along which every subpixel color may be found with minimal unused space or repetition. For example, a circular path may not have a diameter greater than the sum of the lateral dimensions of the subpixels of every subpixel color. In some examples, the lateral dimensions of a subpixel may refer to the spacing between centers of a subpixel. In some examples, the actual lateral dimensions of a light-emitting element of a subpixel may be less than the spacing between the subpixels.

According to some embodiments, another technique suitable for temporal subpixel averaging may include using the LLSO to alter the light path laterally from subpixels so that colors of multiple subpixel types appear to emit from the same subpixel location without the array device physically moving. FIG. 3B illustrates an example of a rotating prismatic LLSO 360 that may alter a light path 362 from an exemplary light-emitting region of an array 366 by one or more subpixel widths, resulting in a subpixel location that may include light from multiple adjacent subpixel types disposed along a curved, e.g., circular, path centered about and/or surrounding the subpixel location.

In the top example shown in FIG. 3B, exemplary light path 362 emits from a location to the left of axis 364, while in the lower example, exemplary light path 362 emits from a location to the right of axis 364. The source of light path 362 has not changed, but the emitted location varies, in this example, in a circular path in conjunction with rotation of prism LLSO 360. If the time it takes to travel one full rotation of the prism LLSO 360 equals the time to transition through the colors of light from a subpixel, a single subpixel location may appear to emit the colors of light during one rotation of the prism LLSO 360. The prism LLSO 360 may be utilized with any suitable subpixel layout, including the exemplary subpixel layouts disclosed herein.

The LLSO may be, in part, prismatic in profile, such as a regular triangular prism. In alternative embodiments, the prism may be one of a polarizing prism, a Wollaston prism, an amici roof prism, a dove prism, or a pair of Risley prisms. In some alternative or additional embodiments, one or both surfaces of the prism may have optical power. In some alternative or additional embodiments, the optical power may be anamorphic. In some embodiments, the LLSO 360 may be a tilted optical window (e.g., a tilted or tiltable glass plate or lens).

An alternative embodiment for an LLSO (e.g., LLSO 345 shown in FIG. 3A) is an electrically switchable liquid crystal grating. Optical diffraction gratings may be used in technologies such as multiplexing and processing optical signals. The latter including optical interconnections, beam steering, and sensor array interrogation. In addition, they provide protection to sensors from a hostile environment. Liquid crystals (LC), whose refractive indices may be modulated by an externally applied voltage, enable a design of very high efficiency phase gratings. Moreover, for such gratings, optical properties such as birefringence may be dynamically manipulated. Switchable diffraction gratings may be based, for example, on polymer-stabilized dual frequency nematic liquid crystals. An alternative would be polymer-stabilized cholesteric gratings.

An LC switchable blazed grating may have the following composition. The substrate of the device may be a form of acrylate which is on top of a transparent metal (e.g., indium tin oxide ITO) coated glass. A transparent cover glass (e.g., ITO glass) may be disposed on top of the blazed grating, with a separation between these layers of a few microns. A thin layer of nematic or another appropriate LC may be sandwiched in between. The ITO layer deposited underneath the grating and another ITO layer coated on the bottom surface of the cover plate may be used to electrically drive the LS to change the phase information of the illuminating light. The refractivity of the nematic or another appropriate LC for extraordinary light may be altered by a driving voltage. With no electric field present, refractive indices of the substrate and the LC may be different, and strong diffraction may be produced by the index-phase difference in the off state. Upon application of an electric field, the refractive index of the LC may be decreased. At a certain driving voltage, index matching may occur between the acrylate and the LC. Thus, the device is either on or off, which may provide undeflected or deflected light, respectively. For multiple angles, stacks of these units (e.g., with different grating periods) may be used. Different driving conditions for each stack and/or multiple steering angles may be produced.

Two-dimensional switchable liquid crystal blazed gratings (e.g., cholesteric) may be achieved by applying an electric field to a cholesteric at the optimum field conditions (frequency and voltage) and cholesteric pitch to cell thickness ratio. Alternatively, a polymer-based liquid crystal blazed grating having a prismatic polymer microstructure may be used as a light deviator, such as an LLSO. A stack of liquid crystal switchable blazed gratings (LCSBGS) may allow a plurality of deflection angles.

Thus, a light deviator, such as an LLSO, or a plurality of LLSOs, may possess a plurality of degrees of freedom allowed by rotation, tilt, pivot, and those that may be available from a liquid crystal switchable grating stack including voltages and frequencies for each layer of a stack, which includes at least one reflection control. These functions would be under the control of, for example, the controller 320 shown in FIG. 3A.

An LLSO providing lateral translation of light emitted from a single subpixel in a subpixel array (such as the one in FIG. 3B) may provide to a viewer an impression of a curve of light and not a single unresolvable point of light. If the LLSO is a regular prism, as depicted in FIG. 3B, then the curve may appear to be a circular ring.

An example is illustrated in FIG. 3C, which shows an exemplary system 370 in which a center subpixel 376 of an array 372 of individual subpixels 374 is operably illuminated, and during the rotation of the LLSO (e.g., LLSO 360 shown in FIG. 3B), the refracted and thus laterally-shifted light to the viewer appears as a curve of light 378. This may be the case if a complete cycle or rotation of the LLSO is less than the integration time of the typical eye, usually <300 ms. The LLSO used in the generation of this exemplary curve of light may be that of a rotating regular prism, possessing no optical power.

As has been alluded to previously, the subpixel described hereinabove may be one of any of at least three subpixels, and in some examples four or more subpixels, included in emissive arrays. Each of these subpixels may emit spectral distributions that appears to be one of the colors of red, green, blue, and white. Subpixels may be present in some embodiments that emit additional or alternative colors. In at least one embodiment, each subpixel of a display may emit the same color, where, for example, the display is part of a multi-display system having multiple displays that each emit a different color and the light emitted by the multiple displays is combined to form a single image.

The light emitted from a given subpixel (i.e., a generator subpixel) may be mapped to any of the locations of a unique set of specific subpixels, referred to, for example, as the generator subpixel's set of virtual locations. The uniqueness of that set of virtual locations may depend on the design of the light deviator/LLSO and the space (i.e., allowable) of its movements. The elements of that set may all have the same property such that light from a first generator subpixel may be translocated or shifted to any virtual location within that set. Moreover, the first generator subpixel is not a member of that set of virtual locations. However, every member of that set of virtual locations may be a generator subpixel for the first generator subpixel. Which member of that set of virtual locations becomes the virtually illuminated subpixel may depend on the timing of subpixel illumination with an appropriately determined position of the LLSO.

The generator subpixel may thus have the ability to mimic, replace, and/or augment the light being emitted by any subpixel within the set of subpixels that underlie the set of virtual locations associated with a specific generator subpixel. Conversely, any subpixel that underlies any of the virtual locations has a virtual location in the generator subpixel itself. With this type of mapping, the light from the generator subpixel may contribute to the intensity and/or color of the subpixel that underlies the translated light. Advantageously, should the subpixel that underlies a virtual location of a generator subpixel be dead or weak, then the light from that generator subpixel may substitute for or contribute to that which the dead/weak subpixel cannot produce. The number of virtual locations per subpixel may be the same across the array. However, locations near edges or corners of the array may have fewer generator subpixels that can contribute to them.

With some embodiments of the light deviator or LLSO optical designs, the set of virtual locations may form a ring or a thin annulus. In alternative embodiments of the light deviator optical design, the set of virtual locations may form a non-circular curve. The non-circular curve may take the shape of an ellipse in the case of an anamorphic light deviator. Additionally or alternatively, embodiments may allow for a family of generator subpixels centered on a subpixel, which is not itself a generator subpixel of that family. Such embodiments may be produced by a combination of anamorphic optical design and possible movements of the light deviator or LLSO including rotation, tilt, pivot, and/or reflection(s).

The size and characteristics of the curve as seen by a viewer is dependent primarily on optical properties of the light deviator/LLSO and on the space of allowable movements of the light deviator (LLSO). General optical properties may include the shape of the LLSO design (thickness, prismatic angle, refractivity, optical power, anamorphic, etc.). In the case of a regular prism LLSO, these optical properties may include the distance of the operably illuminated subpixel from the LLSO, the thickness of the LLSO, the apex angle of the LLSO, and the refractivity of the glass or substrate of the LLSO. As the refractivity of the LLSO is often dispersive, it follows that the extent of the distance of the curves from the generator subpixel (diameter, width)

produced for each of the different subpixel colors, may vary slightly between disparate colors. However, given that even light from a subpixel seen by a viewer may not be resolvable with typical foveal resolution, the curves from adjacent subpixels each emitting differing colors may be seen to be essentially co-incident. In some embodiments, where the mechanical degrees of freedom of the LLSO may be greater than one, a supra-subpixel width of the curve may be possible.

In various embodiments, an image may be represented by a set of subframes $SF_j$. Each subframe may be generated by illuminating a set of subpixels using a set of predetermined parameters derived from processing a set of input data which may lead to displaying an image via temporal multiplexing to a viewer. Input data to a controller (e.g., controller 320 in FIG. 3) may include an image, instructions for generating an image, or portions thereof, a computer-generated model, or a sequence of images such as might be found in an animated GIF, for example. The image format may be a bitmap, a jpg, a png, a svg, tiff, or any other suitable pixel formatted image or data.

Each subframe $SF_j$ may be derived from $$SF_j = \sum_i^{N_j} f(p_{ij} + \Delta p_{ij}, t_{ij} + \Delta t_{ij}, I_{ij}, D_{ij}, x_{ij} + \Delta x_{ij}, y_{ij} + \Delta y_{ij}),$$

where $SF_j$ is the j-th subframe, including a set of $N_j$ subpixels, each i-th subpixel of the $N_j$ subpixels to be illuminated for $SF_j$; where $f$ is a function that represents the various functions of the controller (e.g., controller 320 in FIG. 3), which includes LLSO positioning for the i-th subpixel and illumination of the i-th subpixel using a plurality of parameters. The parameters for the j-th subframe may include: $t_{ij}$=time when the i-th subpixel is illuminated; $D_{ij}$=duration of the i-th subpixel illumination; $(x_{ij}, y_{ij})$ identifies the i-th subpixel by its location within the subpixel array; $I_{ij}$=intensity of the i-th subpixel illumination; $p_{ij}$=position of the LLSO for the i-th subpixel; and a set of incremental deviations of the plurality of parameters, the incremental deviations include: $\Delta t_{ij}$=incremental deviation from the time at which the i-th subpixel is illuminated; $\Delta x_{ij}$, $\Delta y_{ij}$ are incremental deviations defining positional offsets from the i-th subpixel; and $\Delta p_{ij}$=light deviator/LLSO incremental position deviations for the i-th subpixel. The plurality of parameters may be represented as components of a vector $q_{ij}$, and the vector $q_{ij}$ would be at least one of the arguments of the function $f$.

In some embodiments, the positional parameter $p_{ij}$ may have a component related to the rotational or cyclical position of the LLSO, or other time-periodic parameters of the LLSO. In some embodiments, one or more components of the position vector (e.g., the component $p^k_{ij}$) may be cyclical and thus have a period $c^k$ associated with each k-th cyclical component of $p_{ij}$. This may allow for greater efficiency in compensating sub-standard subpixels in that a greater number of compensations for sub-standard subpixels may occur within a smaller number of subframes. In alternative or additional embodiments, the rate of change of any LLSO positional component may be controlled by the controller (e.g., controller 320 in FIG. 3). This may allow for greater efficiency in compensating for sub-standard subpixels in that a greater number of compensations may occur within a preset number of subframes. Other, perhaps non-cyclical, positions of the light deviator/LLSO may be represented by one or more components of $p_{ij}$. The ensemble of positional parameters may be formalized as a vector, where each degree of freedom of the light deviator/LLSO is represented by a component in that vector.

In summary, functions of the array system may include at least: subpixels addressable, illumination of subpixels, and/or duration of subpixel illumination. Optical system functions may include at least: lateral translocation of light, rotation (e.g., rotational position and/or speed), tilt, pivot, reflection control, varifocal adjustment, focus adjustment of light from the array to downstream optics, eye tracking, waveguide control, foveated rendering of one or more images based on eye tracking information, electro-optical deformable surface adjustment, manipulation of individual optical elements in 3D, lateral shifting of the subpixel array, and/or lateral and/or axial shifting of any optical component.

Additionally or alternatively, the described embodiments may be used in conjunction with temporally-multiplexed resolution enhancement and/or redundancy. For example, the same process of splitting images into multiple subframes may be used in various optical applications described herein and the subframe adjustments necessary for each application may be mutually compatible. The subframes of an image may be projected towards a viewer within the integration time of a typical eye, and thus the combination of the information contained in each subframe may appear to be associated with an image. Any suitable number of subframes may be utilized and may range, for example, from one to approximately 32.

A system may be so designed as to generate an image to be viewed by a viewer. Such a system may include a subpixel array system including a plurality of subpixels and an optical system, which may be designed to receive light from at least one subpixel of the subpixel array system and shift laterally the received light by a light deviator/LLSO, and to direct the laterally shifted light towards a viewer. The system may also include a controller, which receives and converts input data into a sequence of instructions to cause the generation of one or more subframes by controlling a plurality of functions of the subpixel array system and of the optical system, each of the one or more subframes including light from a set of subpixels of the plurality of subpixels emitted at a predetermined time and at a predetermined position of the LLSO with respect to at least one of the lateral-light-shifting degrees of freedom of the light deviator/LLSO. An image may then be generated in the visual cortex of a viewer by one or more of the techniques of temporal multiplexing described herein.

Techniques of temporal multiplexing of a display or an array of subpixels may involve creating the impression of an image by rapidly overlapping a sequence of subframes. Such may also include the technique of interlacing, wobulation, and field sequential color. Interlacing is a technique that displays half of the lines of an image in a subframe and the other half in a subsequent subframe. Wobulation is a technique that divides high-resolution images into two half-resolution subframes that may be overlapped with a half-pixel offset. Field-sequential color may segregate the image into monochromatic subframes which may then displayed. In addition to these, an alternative or additional technique is sequential presentation of the subframes to the display. Additionally, temporal multiplexing a series of subframes may be used to compensate for one or more out-of-spec subpixels. For example, the ability to translocate light from a generator subpixel to any member of its set of virtual locations means that light may appear to emanate from dead or weak (i.e., sub-standard) subpixels. Thus, a first set of subpixels, with standard performance, may provide light to a second set of subpixels, with sub-standard performance.

Subpixel array 215 in FIG. 2 or subpixel array 305 in FIG. 3A may include any suitable emissive array technology, which is subpixel addressable. For example, subpixel array 215 may include pixels/subpixels formed of light-emitting diodes (LEDs), organic light-emitting diodes (OLEDs), plasma cells, electrophoretic array elements, liquid crystal array (LCD) components, electrowetting array elements, cathode ray tube (CRT elements), and/or any other suitable image pixel technology. Backlit display or projecting systems may also be viable.

In some embodiments, a single emissive element may not operably emit more than a single color, and therefore, multiple emissive elements may be used to produce each color pixel, with the size of an array pixel being equal to the sum of the sizes of its constituent subpixels.

In at least one example, light-emitting regions may include regions of light emitted from a backlight unit and passing through a light-modulating layer, such as a liquid crystal layer. Additionally, or alternatively, light-emitting regions may include regions of light corresponding to individual LED elements, OLED elements, plasma cells, electrophoretic array elements, quantum rods, quantum dots, electrowetting array elements, CRT elements, and/or any other suitable subpixel technology.

Additionally or alternatively, the described embodiments may be used in conjunction with temporally-multiplexed resolution enhancement and/or redundancy. For example, the same process of dividing an image into multiple subframes may be used by these and other applications. The subframe adjustments necessary for each application may be mutually compatible. The subframes of an image may be temporally multiplexed towards a viewer within the integration time of a typical eye, and thus the combination of the information contained in each subframe appears to be associated with an image. The number of subframes may range from two to approximately 32 or more.

Some embodiments may include segregating or distributing the intensities in an image or input between various subframes. In at least one embodiment, the intensities of an image or input data may be divided into sets of subframes associated with a particular color or channel, or a combination of colors and/or channels. Alternatively, or additionally, the intensities of the image may be distributed within a set of subframes according to the level or value of the intensities of the image. Thus, intensities ranging from, for example, 0 to 55 in the image of, e.g., 8-bits, may be processed into a first subframe. The intensities may be scaled, lowered in value by a zero-point shift, and/or compressed to decrease the bit-depth of the subframe, which may, in this specific example, be 5-bits. A second subframe might contain, e.g., a range of intensities from the image of from 56 to 119, and with a zero-point shift, the required number of bits for the second subframe would be 6. This may be without scaling or compression. If either of those mathematical operations are being applied to the image range of intensities of 56 to 119, then 5 bits may be required. Similarly, a third subframe may be generated for another intensity range of the set of intensities of the image, e.g., 120 to 255. Again, with another zero-point shift, and a scaling, the number of bits required for the subframe may be 7. Each of the three subframes so described hereinabove may be transferred to the array system in a sequential manner. In some examples, each of the subframes may be displayed as it is received or, if required, any possible conversions may be applied prior to being sent to the emissive array of subpixels.

In some embodiments, a subframe, with transformed data contained therein, may be sent to the array system for display. The array circuitry may then transform the data in the subframe back into its pre-transferred form and then forward the subframe information to the subpixel array.

In some embodiments, the intensities of an image with $2^M$ bit-depth may be distributed amongst N subframes. Each of the N subframes may be populated with intensities that may be a distinct fraction of, or distinct subsets of, ranges of intensities found in the image including a $2^M$ bit-depth.

In an example of an embodiment including four subframes, subframe 1 may have a bit-depth of 0 to $2^{x1}-1$, subframe 2 may have a bit-depth from $2^{x1}$ to $2^{x1+x2}-1$, subframe 3 may have a bit-depth of $2^{x1+x2}$ to $2^{x1+x2+x3}-1$, and subframe 4 may have a bit-depth of to $2^{x1+x2+x3}$ to $2^M-1$. In this case the sum of the exponents of the fractional bit-depths sum to M, and thus: x1+x2+x3+x4=M. Thus, for example, if there were N subframes, the fractional bit-depths, fractional intensity ranges, or dynamic ranges may only be constrained by the following equation:

$$\sum_{i=1}^{i=N} x_i = M$$

Additional examples of this embodiment may be derived by using a number of subframes that is less than or greater than the four used in the above-described scenario.

In at least one embodiment, the fractionalization between subframes may be based on the bit-depth of the original image, on one or more colors or channels of the image, or combinations thereof. An alternative fractionalization may be based on the dynamic range of the image.

In some examples, as an image may contain a plurality of channels or colors, the data associated exclusively with a particular channel may be used to generate a subframe or a set of subframes. In this case, the dimensional size of the subframe or set of subframes may be a fraction of the dimensional size of the original image. This will facilitate transfer between locations within, e.g., a head-mounted display. A typical color image may have, e.g., three or four color channels. An image may be composed of pixels which may be an artificial construct, as the pixels themselves may be composed of subpixels which emit spectral distributions that resemble red, green, blue, and perhaps even white. Causing one or more adjacent subpixels to emit their respective spectral distributions simultaneously or nearly so may permit a viewer to discern a particular color and not the separate contributory colors emitted by the respective subpixels.

The subpixel is the smallest addressable light emitting unit. In emissive arrays that use LEDs, OLEDs, or phosphor coatings, the emitted spectral distributions may cover a range of wavelengths that exceed a more monochromatic distribution. From an operational point of view, an image may be considered to be an array of subpixels with the subpixels of a particular color distributed in a particular pattern within the image. Thus, if the image intensities of each color were copied into a subframe of the same size as that of the image while retaining their relative positions in the subframe as they may be in the image, then the subframe may retain all the same positional information for that color as is in the image. This may be repeated for each separate color. If all those subframes with intensities of a specific color were co-added together, the image may be reproduced.

Transferring a subframe so constructed may be an inefficient transfer, for a great portion of the elements of that subframe may contain no information relevant to that particular color or channel. The elements of that subframe may not contain information from that of a different color. Thus, to increase the transfer speed of a subframe, representing a specific color or channel, to the array system the subframe may be reduced to contain those elements that may be associated with, e.g., a green subpixel.

Reducing the size of the subframe to one that contains only information that may be derived from a specific channel, and thus may allow the reduction of the size of the subframe to be transferred from a first location to a second location. Moreover, there may be a one-to-one correspondence between an element in the subframe with an element in the image. Thus, if there were, e.g., equal numbers of RBG subpixels, the size of the subframe with, e.g., green information, may be one third the size of the image, and thus may be faster to transfer between locations.

In some embodiments, at the second location, the subframe with color-only information may then be expanded back into the same dimensional size as of its origin, e.g., the image. At this point at least two alternative embodiments may be possible: (1) the expanded subframe with green information is sent to the array system for display along with the various other subframes with separate color information; or (2) the various subframes with separate color information may be then co-added to reconstitute a representation of the image, which is then sent to the array system for display.

There may be at least three separate values relevant to digital images and the display of those digital images: subpixel intensity, subpixel bit-depth, and subpixel dynamic range. The subframes, possessing data to be displayed, may have a different bit-depth than what the display may be able to handle. If the subframe has a bit-depth in excess of the designed bit-depth of the display, a transformation from the higher bit-depth to the lower bit-depth may be required. The types of transformations that may be applicable may be scaling and/or compression, such as that of H.264, in which the compression may be lossy or lossless. Some of these techniques may include or may be similar to temporal dithering.

In various embodiments, bit-depth may either refer to the range of possible values in the smallest addressable unit for a given channel (such as a subpixel or pixel as the situation may allow) or to the total range of allowable values over all available channels. A channel may refer to a particular color. Bit-depth values may range from a few bits to at least 16 bits per channel. Displays may, for example, easily accommodate 8-bits per channel. Oftentimes there may be three channels per display (e.g., distinct channels for red, green, and blue colors). This translates into a total bit-depth of 24 bits, or over 16.7 million color variations. The range or gamut of color perception of a typical human eye is less than what is offered by 24-bits of RGB bit-depth. Additional channels of colors cyan, magenta, and yellow, may easily be possible, thus bringing the total up to and greater than 48-bits of bit-depth for a display.

In the present context, bit-depth may correlate to the maximum value of intensity that a subpixel or pixel may possess without losing information. A bit-depth of 8-bits translates into values of between 0 and 255 as there are $2^8=256$ values. While a subpixel or pixel may have a certain range of values that it may possibly achieve, this is usually either the same as or a fraction of the dynamic range of that subpixel. The value of the bit-depth is an artificial limitation imposed by the computational constraints of the input data and/or the controller 320 in FIG. 3A, or the system outlined in either FIG. 2 or FIG. 3A. It also may be limited in the number of levels that may be uniquely perceived by a typical eye. The level of the perceptible intensity steps may be color dependent. Thus, for some colors, a lower bit-depth may be more appropriate than for other colors.

In the case of emission displays or arrays, such as that of the subpixel array 215 or its associated array system, some subpixel intensity values may be controlled by the duration and/or frequency of illumination, i.e., the period of time a subpixel is energized or caused to appear to be energized, or its duty cycle.

Separate from the practical requirements of imposing a finite intensity value for each subpixel is dynamic range. This is the range of intensities from the absolute lowest to the absolute highest that may be achieved for the subpixels in a display. The absolute lowest may be from a noise floor which may be due to electronic noise or scattering of light from other sources. The absolute highest value may be due to some constraint such as the subpixel overheating from a high duty cycle or fatigue that may alter the intensity and spectral distribution of the emitted light. Such behavior may introduce non-linear behavior in precise controlling of the desired intensity. Dynamic range may be a physical limitation in the electronics of the display system. A given subpixel may be illuminated in such a manner that the value of the illumination vs. level of energizing (duty cycle and current) falls on the linear part of the relationship between those two limits. Intensities that may deviate from the linear part of the dynamic range of the system may be often pegged at a high value of the linear part of the dynamic range and may receive a maximum value according to the bit-depth of the image and/or subframe construct.

Intensity of a given subpixel is another concept. This is the value of intensity received by a given subpixel within the specified bit-depth. In some embodiments, if the intensity received by a given subpixel exceeds the maximum value of the bit-depth (e.g., 255), then the value of that intensity may be capped at the maximum allowed by the bit-depth. Thus, if the bit-depth for a subpixel is $2^8$, then the illumination may result in an intensity set to 255. An alternative approach may be to scale all values to fit within the specified bit-depth, either with a linear or non-linear transformation. Alternatively, an algorithm to compress the data, either with loss of information or without such a loss may be appropriate. Thus, intensity may be limited by the bit-depth. The bit-depth is normally limited by the dynamic range, but not universally, such as the perception of intensity levels within a given bit-depth. An example is binary vision, which may refer to vision that is so structured that an image above a threshold is seen as on (or 1), and another image with an intensity below that threshold registers as off (or 0). In other words, a bitmap vision. Thus, only two levels may be required which may be represented by only one bit.

The bit-depth may be so chosen that the range of intensities available with that bit-depth is coincident with the dynamic range of the subpixel. For example, a subpixel might have a dynamic range of 1 to $10^6$. However, the bit-depth for such a range, without scaling of the subpixel intensity or data, would be $2^{20}$ (a bit-depth that may not be achievable in convention displays). If there are subpixels for each of the standard primary colors, RBG, then a bit-depth may be $2^{60}$. Thus, to accommodate that dynamic range within a more typically available bit-depth, a transformation of the intensities may have to occur. Such a transformation may be linear or non-linear. Moreover, while the bit-depth defines the range of intensities in a given subpixel, it does not define or dictate the actual intensity, which may vary from 0 to the maximum allowed by the chosen bit-depth.

Subpixels in an image may have bit-depths that range from 8 bits to 36 bits or more. Typically, in RGB images, each of the three colors may have a bit-depth of at least 8 bits. Thus, with three colors, at least 24-bits may be required. For large format images, this may result in a large amount of data that needs to be transferred. The problem may be exceptionally exacerbated if such data needs to be transferred, e.g., to the array system every few milliseconds.

In some embodiments, in order to increase the efficiency or bandwidth of the transfer of an image from one location to another (e.g., within system 750 of FIG. 7, as described in greater detail below) or from the controller 320 to a subpixel array 305 in FIG. 3A, data or subpixels which may include that image may be processed to eliminate or reduce redundancies or to reduce file transfer size. To reduce the extent of the transfer problem, the image may be processed to compress, to predict, and/or to transform the pixel data into a form that will transfer more quickly.

Besides the aforementioned approaches, an alternative or additional embodiment may be to process the image into subframes. Within temporal multiplexing, where sequences of subframes may be presented in rapid succession to a viewer, then the data may be combined, not in the actual processing unit or display, but in the visual cortex of that viewer. Each of these subframes may include a fraction of the information that is available in the original image. Temporal multiplexing may allow for such a combination of subframes without the actual mathematical procedure to add the subframes together before display.

While an image possesses a set of intensities, it may be desirable that only a range of those intensities may be considered in the populating of a plurality of subframes. Generally, there will be a distribution of intensities in the image which may gradually taper off towards zero. Some of these intensities may be a result of imperfections in the original image, which result in lower values than what otherwise may be expected if the imperfections were not present. Examples for an image obtained with a camera might be dust on the sensor or on the lens.

At the higher-intensity end, there may also be imperfections that taper off to the maximum intensity allowable by the bit-depth. These bright imperfections may either be statistical fluctuations as compared with a local mean or median, or originate from exceptionally bright pixels which deviate from a more typical performance of subpixels, or perhaps just specular reflections in the scene. In some examples, the set of intensities used to generate the subframes may be selected to avoid these deficient subsets of the set of intensities may be mapped into the plurality of subframes. The deficiencies may be overcome with image processing, such as a median filter to replace them with more locally typical intensities.

In some embodiments, techniques of temporal multiplexing of a display or array of subpixels may involve creating the impression of an image by rapidly overlapping a plurality of subframes. Such may also include the technique of interlacing, wobulation, and/or field sequential color. Interlacing is a technique which displays half of the lines of an image in a subframe, and the other half in a subsequent subframe. Wobulation is a technique that divides high-resolution images into two half-resolution subframes that may be overlapped with a half-pixel offset. Field-sequential color segregates the image into monochromatic subframes which may then be displayed. In addition to these, an alternative or additional technique is sequential presentation of the subframes to the display.

In some embodiments, the fractionalization into subframes may be based on the intensity levels of a given image. Segregation according to intensities found in an image may, for example, be determined from processing a histogram of the image intensities to determine a set of fractional intensities that are each assigned to a specific subframe. Segregation into subframes using an "energy" metric of the frequency of a given intensity times that intensity may allow for efficient separation of ranges of intensities between subframes. Additional segregation into subframes of the image intensity data may occur using both an energy metric and an entropy metric. This may permit greater control over how the image intensity data may be optimally segregated into subframes.

Many histograms of images taken outside in daylight may have at least two peaks—one for the background (e.g., sky) and one for the foreground (buildings, people, cars). In some embodiments, one or more subframes may be dedicated to a subset of the set of intensities assigned to the background, and one or more subframes may be dedicated to a subset of the set of intensities assigned to the foreground. Thus, the foreground intensities may be separated into fractions or ranges and a subframe populated with that fraction or range. The same procedure may occur for the background, with a separate subframe or subframes.

In additional embodiments, a zero-point offset may be applied to reduce the range of intensities to be within the bit-depth of that specific subframe (SF). In an example, if the intensities in an image may be segregated, such as the following: $SF_1$: 0 to 20; $SF_2$: 21 to 90; $SF_3$: 91 to 170; and $SF_4$: 171 to 255, for an image bit-depth of $2^8$, then with a zero-point shift, where the zero-point shift accompanies its respective subframe, then the intensities in each of the subframes would be $SF_1$: 0 to 20; $SF_2$: 1 to 70; $SF_3$: 1 to 80; and $SF_4$: 1 to 85. In additional embodiments, the subpixel intensities may be compressed or mathematically modified so that the effective bit-depth range of each subframe may be as follows: $SF_1$: $2^4$; $SF_2$: $2^6$; $SF_3$: $2^6$; and $SF_4$: $2^6$. Restoration of the original values of the data in the subframes may occur just prior to display.

In some embodiments, the least significant bit of each of the subframes may be dropped. In additional or alternative embodiments, compression of each subframe may occur, with the compression being either lossless or lossy in order to reduce the bit-depth of each subframe.

In an example, a temporally-multiplexed display may use four subframes for the purposes of subpixel repair. In this case, the colors or intensities of different subpixels in the image may be varied between subframes in a way that may result in an effective full image that may be perceptually very similar to the original image. Thus, full-color bit-depth may be achieved by overlapping subframes with reduced bit-depth.

For example, if the display is intended to display 8 bits of blue (256 levels of intensities, i.e., 0 to 255), the display may be capable of 6 bits of blue (64 levels of intensities from 0 to 63). In an additional embodiment, the full 8 bits of blue may then be recovered by summing the intensities from the four subframes. For example, a maximum intensity of 255 may be formed by all four subframe subpixels displaying an intensity equivalent to a maximum of 63.75 (i.e., 255 intensity steps divided by 4 subframes). In some examples, since a subframe having a bit-depth of 6 has 0 to 63 subframe steps, each subframe step from 0 to 63 may be spaced equally such that each subframe step is equivalent to an incremental intensity step of approximately 1.012 such that the subframe subpixels each have a minimum intensity of 0 and a maximum intensity of 63.75. Alternatively, any suitable combination of different intensity steps may be used for the subframe steps to produce a maximum intensity of 63.75. For example, subframe steps for a subframe having a bit-depth of 6 may be divided up according to intensity such that 60 subframe steps each have an intensity step of 1, while 3 additional subframe steps each have an intensity step of 1.25. Any other suitable division of intensity steps among subframe steps 0-63 may be utilized in each subframe to produce a maximum subframe intensity of 63.75 in a case where four subframes are temporally combined to generate a frame equivalent to 8 bits with a maximum intensity of 255. In additional embodiments, a greater number of subframes (e.g., five or more subframes) may be utilized to obtain a desired maximum frame bit-depth.

For many colors, there may be multiple combinations of subframe subpixel intensities that may lead to the desired combined intensity. For example, a frame intensity of 100 may be formed by one subframe displaying intensity 63, a second subframe displaying intensity 31, and third and fourth subframes each displaying intensity 3. Alternatively, all four subframes might display intensity 25. In conjunction with display calibration, the per-subframe intensity values might be chosen to accommodate the limitations of individual defective subpixels.

Instead of each subframe having a slightly reduced bit-depth identical to the other subframes, subframes might each display a unique combination of intensity levels, essentially each acting as two bits of the full 8-bit color space. For example, the first subframe might be capable of intensities 128, 64, and 192 (128+64); the second might be capable of intensities 32, 16, and 48 (32+16), the third might be capable of intensities 8, 4, and 12, and the fourth might be capable of intensities 2, 1, and 3. All four subframes may be capable of intensity 0. Appropriate choice of intensities for each subframe may allow full reconstruction of the original 8-bit color.

Perceptually, a set of intensities such as 192+48+12+3 may not be the same as the set of intensities 64+64+64+64. It may be possible that, to reduce perceptual artifacts, certain assignments of unique intensity levels per subframe may be preferred over others, or that a combination of specific intensity levels and redundant intensity levels may be preferred: for example, two subframes each capable of intensities 128, 4, 2, 1, and all combinations thereof; and two subframes might be capable of intensities 64, 32, 16, and 8 and all combinations thereof. Alternatively, one subframe may be capable of intensities 128, 32, 8, and 2 (and combinations thereof); one subframe may be capable of intensities 64, 16, 4, and 1; one subframe may be capable of intensities 128, 64, 32, and 16; and one subframe may be capable of intensities 8, 4, 2, and 1.

FIG. 4 demonstrates, in an example, an approach 400 to generate a set of subframes from image data. In this example, the image generated based on the image data may include a row of five pixels or subpixels 402, each associated with an intensity. In some examples, the generated image may be the image generated at a viewing region of a display device that is visible to a viewer (e.g., an image formed by image light 340 and visible to eye 330 at eye box 325 as shown in FIG. 3A). As described above, the five pixels or subpixels 402 of the image illustrated in FIG. 4 may each be generated at a virtual pixel or subpixel location (e.g., located at eye box 325) by light emitted by two or more separate emissive subpixels of a light-emitting array (e.g., subpixel array 305 in FIG. 3A) during different subframe time periods. Each of the subframe time periods may, for example, correspond to different positions (e.g., rotational orientations) of a light deviator (e.g., LLSO 345 in FIG. 3A) that laterally shifts light from the light emitting array in different directions during the respective subframe time periods, as described above. Additionally or alternatively, any other suitable method for utilizing light from two or more separate emissive subpixels to generate a single pixel or subpixel viewable in a viewing region (e.g., eye box 325 in FIG. 3A) may be used. For example, one or more actuators may move the light-emitting array so that a different emissive subpixel illuminates a single virtual pixel or subpixel location during each subframe. Other techniques for shifting light from two or more emissive subpixels to a single subpixel location in a viewing region may include, for example, a movable lens or lens array that is translated along a path (e.g., a circular path) parallel to the subpixel array, or a liquid crystal switchable grating stack that allows light from the emissive array to be deflected at two or more deflection angles. Accordingly, the image light forming each of pixels or subpixels 402 may be emitted from different light-emitting regions of a light-emitting array during two or more of subframes SF-1 to SF-4.

In the example illustrated in FIG. 4, the bit-depth of the image is 8-bits and thus has a range of 0 to 255. Four subframes may be generated: SF-1, SF-2, SF-3, and SF-4 as illustrated in FIG. 4. Subframe SF-1 has a bit-depth of 7. Subframe SF-2 has a bit-depth of 6 as does SF-3. SF-4 has a bit-depth of 2. For each subpixel 402 of the image, in this example, the intensities have been segregated; SF-1 receives a value up to 127; SF-2 receives a value that is the excess above 127 (i.e., the max of SF-1); SF-3 receives a value that is the excess above 127+63 (i.e., the combined max of SF-1+max SF-2); and SF-4 receives a value that is the excess above 127+63+63 (i.e., the combined max of SF-1+max SF-2+max SF-3), where max=maximum possible value for that subframe.

The specific choice of intensity assignments per subframe may be dependent on whether dead, dim, or hot subpixels (hereinafter, "bad pixels") need to be compensated, or whether the image being displayed might use the full range of allowable intensity values, using distinct or partially-unshared per subframe intensity assignments. Accordingly, while the total amount of time needed to transfer the data between locations may be the same or substantially the same due to the total number of transferred bits being the same, the data may start being acted on (i.e., displayed) as soon as the first subframe of data comes in, instead of having to wait for the full frame to be transferred before the image can start to be displayed. Accordingly, such a technique may essentially allow the display to act as a temporal version of a rolling shutter, with at least a portion of the image data being displayed more quickly.

In alternative embodiments, where a plurality of colors is displayable, one or more subframes may be generated from one or more combinations of these displayable colors. A special subframe may be generated indicating which subpixel in an associated subframe corresponds to a particular color. For example, if there were the three primary colors (RGB), then the elements of the special subframe may take on the values of 0 for R, 1 for G, and 2 for B. In this case, a bit-depth of two may be appropriate. The fourth value of 3 may be used to indicate a bad pixel. With this embodiment, similar ranges of intensities irrespective of color may be placed into one or more common subframes, and the color of a given subpixel identified by the appropriate entry in the special subframe.

As indicated previously, several channels may be available, with each channel associated with a color. A possible additional channel, and one not associated with a particular color, may be that of alpha transparency, or just alpha channel. The alpha channel (or image) may be used to format a background or other section of a more composite image. The values of the elements of this channel are either 0 or 1. This is used as a mask to aid in creating a background, in combination with at least one other associated image (or color channel). The value of 0 means that element contributes nothing to the combined image. An alpha channel element value of 1 blocks any contribution from its associated image, i.e., the element creates an opaque screen or barrier to whatever is in the equivalent element position in the associated image (or color channel).

In an example of an embodiment, intensities of any subpixel found in the original image with several colors or channels may be segregated according to only a range of intensities, irrespective of color. Thus, a first subframe may have a bit-depth of 4 and contain any RGB intensity that is in the range of 0 to 15 without a zero-point shift. A second subframe may have bit-depth of 6 and contain any intensity data that is the range of 16 to 79, but with a zero-point shift of −16 such that the lowest value of the second subframe is 0. A third subframe may have a bit-depth of 6 and contain a range of intensity data from 80 to 143, but with a zero-point shift of −80 such that the lowest value of the third subframe is 0. A fourth subframe may have a bit-depth of 7 and contain a range of intensity data from 144 to 255, but with a zero-point shift of −144 such that the lowest value of the fourth subframe is 0. The zero-point shifts may be incorporated into the meta-data of the subframe prior to a transfer, or transferred separately from that of the subframes. The transfer of the fourth subframes may occur in any order, and thus the identification as first, second, etc. subframe may not be related to the transfer sequence to the display.

In alternative or additional embodiments, a special subframe may be generated which indicates, for each element of the special subframe, a particular type of compression applied to the intensity level for an associated subframe (one or more subframes) which actually contains the intensity information in some predetermined form. For the current example, the special subframe is given a bit-depth of two, meaning four values are possible: 0, 1, 2, and 3. For example, if an element in the special subframe possessed a value of zero, then this may mean that no processing of the original intensity information has occurred. A value of one for the element in the special subframe may indicate a first type of intensity transformation, such as a scaling or a lossless compression. A value of 2 may indicate a second type of intensity transformation, and a value of 3, perhaps even a third type of intensity transformation. This type of additional information may allow for even further reduction in bit-depth of the associated subframe. Both the special subframe and the associated subframe(s) may be transferred from a first location to a second location nearly concurrently. A restoration of the data contained in the associated subframe(s) may occur just prior to energizing the subpixel array, or the circuitry contained therein, with the information contained therein.

Such an approach may be applicable to particular channels or colors that do not require a fine step of intensity, as the typical eye will not be able to perceive intensity steps or difference for a given color. An example might be blue light, where the typical eye does not perceive fine intensity steps as it would, e.g., with green light.

FIG. 5 is a flow diagram 500 of how the information contained in image data for an image is transferred to a display. As shown in this figure, image data 502 for the image may be processed into subframe data for a set of subframes 504A-C: SF-A, SF-B, and SF-C. The processing may include segregating the intensities of the image in the image data into subframe data for individual subframes SF-A, SF-B, and SF-C. The processing may also include the application of zero-point shifts in the subframe data each of the subframes SF-A, SF-B, and SF-C and any scaling or compression of the subframe data so that the bit-depths of the generated subframes 504A-C may be minimized. The subframe data for the subframes 504A-C may then be transferred by a wired or wireless connection to an array system 508 or a component thereof, e.g., one that processes the subframe data. This further processing of the subframe data may be used, for example, to reverse-transform any of the subframe data that has been transformed before transfer to allow for a more compact data transfer. After transfer and processing, the three subframes 504A-C may be temporally multiplexed to the array of subpixels 510, in which the image, or a reasonable facsimile thereof, will be seen by a viewer, as the individual subframe contributions will have been combined in the visual cortex of the viewer.

FIG. 6 is a flow diagram of an exemplary computer-implemented method for transferring image data for an image to a subpixel array to be viewed by a viewer. The steps shown in FIG. 6 may be performed by any suitable computer-executable code and/or computing system, including the systems illustrated in FIGS. 3 and 7. In one example, each of the steps shown in FIG. 1 may represent an algorithm whose structure includes and/or is represented by multiple sub-steps, examples of which will be provided in greater detail below.

Figure 7:
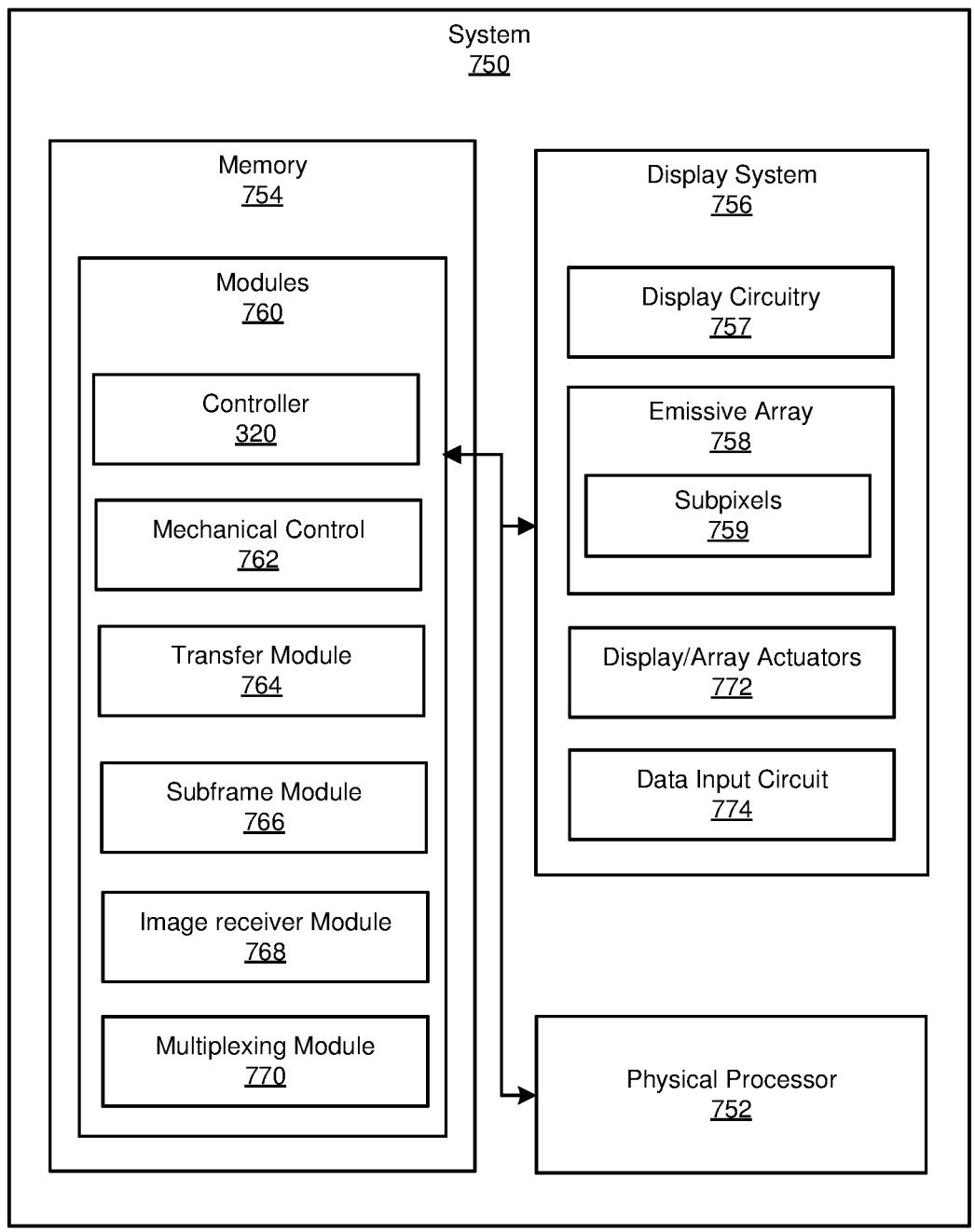
FIG. 7 is a block diagram of an example system suitable for implementing the disclosed generation of subframes in accordance with some embodiments.

As illustrated in FIG. 6, at step 610, one or more of the systems described herein may receive image data for an image at a first location. For example, image receiver module 768 of system 750 of FIG. 7 may perform the step of receiving the image data. The image data may include a set of intensities, and these intensities may be distributed in one or more channels (see, e.g., FIGS. 4 and 5). As illustrated in FIG. 7, example system 750 may also include one or more physical processors, such as physical processor 752. Physical processor 752 generally represents any type or form of hardware-implemented processing unit capable of interpreting and/or executing computer-readable instructions. Physical processor 752 may facilitate the actions of the computer-implemented method illustrated in FIG. 6. In one example, physical processor 752 may access and/or modify one or more of modules 760 stored in memory 754.

As illustrated in FIG. 7, exemplary display system 750 may additionally include one or more modules 760 for performing one or more tasks as disclosed herein, including actions performed by one or more of display circuitry 757, an emissive array 758 including subpixels 759, display/array actuators 772, an optical assembly (e.g., optical assembly 310 in FIG. 3A), a scanning assembly (e.g., scanning assembly 315 in FIG. 3A), and/or one or more controllers 320 (see, e.g., FIG. 3A) for various display subsystems. Such controllers 320 may include, for example, a mechanical control 762, a transfer module 764, a subframe module 766, an image receiver module 768, a multiplexing module 770, and/or a scanning assembly (e.g., scanning assembly 315 in FIG. 3A). Subframe computations in the subframe module 766 may be performed prior to any projection or display activity and may create instructions to other modules to perform their functions and/or actions at designated time intervals in addition to taking image data for an image and processing it into subframe data for a plurality of subframes, which may then be transferred to the display system 756, perhaps with additional processing prior to energizing the appropriate subpixels 759 in the emissive array 758. A multitude of subframes may then be rapidly projected to a viewer such that the viewer comprehends the displayed subframes as an image—the image from which the plurality of subframes was derived. One or more processors 752 may be a component of the infrastructure that contributes to the management of the various functions and modules described hereinabove.

Returning to FIG. 6, at step 620, one or more of the systems described herein may then process the image data for the image into subframe data for a plurality of subframes (see, e.g., FIG. 5). Subframe data for each subframe of the plurality of subframes may include a fractional range of the intensities that are a subset of the set of intensities of the image data for the image (see, e.g., FIG. 4). A module, for example, that may accomplish this processing of image intensities into the information contained in the plurality of subframes might be that of the subframe module 766 of the system 750 illustrated in FIG. 7.

As illustrated in FIG. 6, at step 630, one or more of the systems described herein may transfer subframe data for the plurality of subframes to a second location (see, e.g., FIG. 5). As shown in FIG. 7, for example, the transfer module 764 of the system 750 may perform this task. The second location may be a subpixel array (e.g., subpixel array 305 in FIG. 3A), an array system that may include an array of emissive subpixels, display circuitry, or any suitable temporary storage media (see, e.g., FIG. 5).

As illustrated in FIG. 6, at step 640, one or more of the systems described herein may temporally multiplex the plurality of subframes generated from the subframe data to reconstitute the image in a viewing region so as to create a perception of the image to a viewer (see, e.g., FIG. 5). For example, multiplexing module 770 of system 750 of FIG. 7 may temporally multiplex the plurality of subframes to reconstitute the image in a viewing region (e.g., eye box 325 in FIG. 3A) of display system 756.

In various examples, light from subpixels 759 of emissive array 759 may be temporally multiplexed using an optical system that 1) receives light from at least one of a plurality of subpixels of an emissive array and laterally shifts the received light by a light deviator that is movable between a plurality of positions corresponding to one or more lateral-light-shifting degrees of freedom, each of the plurality of subframes corresponding to a different predetermined position of the light deviator, 2) and directs the laterally shifted light toward the viewing region. For example, the subframe data may be converted by the controller 320 into a sequence of instructions. In some embodiments, display system 756 may be used to facilitate or contribute to the generation of the sequence of instructions. In some examples, the sequence of instructions may include instructions for performing actions or functions of one or more these aforementioned components. According to various embodiments, the optical system (e.g., optical assembly 310 in FIG. 3A) may include a light deviator (e.g., LLSO 345 shown in FIG. 3A) that is movable between a plurality of positions corresponding to one or more lateral-light-shifting degrees of freedom. The light deviator, which is movable between a plurality of positions corresponding to one or more lateral-light-shifting degrees of freedom, may receive light from at least one of a plurality of subpixels 759 (i.e., light-emitting regions) of emissive array 758 and laterally shift the received light in a lateral direction corresponding to a predetermined position of the light deviator. Accordingly, each of a plurality of subpixels of the image displayed in the viewing region may be formed by light from two or more separate subpixels of the emissive array laterally shifted by the light deviator during two or more subframes of the plurality of subframes.

In some embodiments, the first location in step 610, of FIG. 6 may be a portion of the controller 320 of FIG. 3A. In step 630, the subframes may then be transferred to a second location, which may be another portion of a (e.g., controller 320 shown in FIGS. 3 and 7) or a separate entity, such as a component of display circuitry of a subpixel array (e.g., display circuitry 757 shown in FIG. 7). Alternatively, a second portion of a controller may communicate with display circuitry, an array of subpixels, and/or a component of an array system.

In some embodiments, subframe data for each subframe of the plurality of subframes may include a unique fractional range of intensities of the subset of the set of intensities of the image data. Alternatively or additionally, the subframe data for the plurality of subframes may also be generated based on one or more channels. In some embodiments, the channels may each correspond separate colors and/or combinations of colors in the image.

In one example, one or more of the systems described herein may transfer subframe data for a set of subframes of the plurality of subframes to the second location, wherein the subframe data for the set of subframes is specific to a channel or combination of channels of the one or more channels of the image data. For example, transfer module 764 may transfer the subframe data to the second location. According to various examples, each subframe of the set of subframes may be specific to a channel or a combination of channels and may include a dimensional size at the first location that includes only a portion of the image that is specific to the channel or the combination of channels. In at least one example, each subframe of the set of subframes at the second location may either be expanded to a dimensional size of the image and co-added with one or more additional subframes or may be unchanged in dimensional size. In various examples, the plurality of subframes may include four or more subframes.

In various embodiments, one or more of the systems described herein may process the image data to determine a set of relative frequencies of intensities from the subset of the set of intensities of the image data, wherein each subframe of the plurality of subframes has a fractional range of intensities determined from the set of relative frequencies of intensities. For example, subframe module 766 may process the image data to determine the set of relative frequencies of intensities of the image data. In some examples, the frequency of intensities may be determined, for example, using a histogram of the number of subpixels at a certain intensity, and the fractional ranges of the subframe data for each of the plurality of subframes may be determined by the structure of that histogram.

In some examples, one or more of the systems described herein, such as subframe module 766, may mathematically process the intensities of the image data, or subsets of these intensities, so as to reduce the bit-depth of subframe data for individual subframes of the plurality of subframes. For example, the method may further include compressing at least a subset of the set of intensities of the image data at the first location. Examples of mathematical processing include a zero-point offset, and/or scaling of the intensities, and/or compressing the intensities of the subframe data for each of the subframes in the plurality of subframes. In at least one example, a minimum value for the fractional range of intensities of the subframe data for each subframe may be reduced to zero by a zero-point offset that is used to restore the minimum value of the subframe data for that subframe at the second location. In some examples, the size of a set subframes may be specific to a channel or color. In some examples, one or more of the systems described herein may generate subframe data for a special subframe, the values of the elements of the subframe data for that special subframe defining a particular type of transformation of the image intensities that may be placed into the elements of the associated subframe.

In one embodiment, a computer-implemented display method may include receiving, by one or more systems described herein, subframe data for a plurality of subframes, subframe data for each subframe of the plurality of subframes including a plurality of subframe elements, wherein each subframe element includes a value. For example, display system 756 in FIG. 7, which includes emissive array 758 including a plurality of subpixels 759, may receive subframe data for a plurality of subframes. One or more systems described herein may then process the subframe data for the plurality of subframes, wherein the values of the plurality of subframe elements are converted into an array of intensities including a plurality of intensity elements. For example, data input circuit 774 of display system 756 in FIG. 7 may process the subframe data for the plurality of subframes. One or more systems described herein may then, for each intensity element in the array of intensities: (i) map each intensity element to a corresponding subpixel in the plurality of subpixels of the emissive array, (ii) convert the intensity of each intensity element into one or more illumination parameters for the corresponding subpixel, and (iii) cause each subpixel of the emissive array to be illuminated using the one or more corresponding illumination parameters. For example, data input circuit 774 may perform the above-described mapping and converting actions.

In some embodiments, the emissive array 758 of FIG. 7 may include at least three channels, and the plurality of subframes may include at least three subsets of subframes, and each of the at least three subsets of subframes may include each of the at least three channels. In at least one example, converting the intensity of each intensity element into one or more illumination parameters for the corresponding subpixel may include at least one of a zero-point shift, a scaling, or a decompression.

In some embodiments, the described subpixel array devices, subpixel arrangements, and methods may allow for spatial, linear temporal, circular temporal, and/or any other suitable temporal subpixel averaging, enabling an increased range of colors and/or color intensities to be displayed without sacrificing resolution or increasing the subpixel array area. Additionally, the disclosed devices, systems, and methods may enable subpixel array resolution to be enhanced using a movable color selector layer and/or LLSO that enables each subpixel location to function as a pixel emitting various colors that may be averaged temporally. Thus, reference, in the present disclosure, to a pixel may include the components of that pixel, the various subpixels. Each pixel may include subpixels that may be operable to emit a white light when illuminated together. Alternatively, or additionally at least one of the subpixels may emit light that, when viewed by a human agent, appears to be white. Each color of a subpixel may further lie on a linear path such that a linear translation may allow each color subpixel to appear in the same location. Furthermore, each color subpixel may lie on a circular path such that a circular translation may allow each color subpixel to appear in the same location. In some examples, a color selector layer may move while the light source remains stationary.

As discussed throughout the instant disclosure, the disclosed methods, systems, and apparatuses may provide one or more advantages over traditional displays technologies. For example, the disclosed embodiments may facilitate a faster transfer of information contained in an image than by transferring the image itself. The transferred subframes, which may be temporally multiplexed to an array, may allow the image or input data to be perceived by the viewer. Additionally, the disclosed systems, methods, and apparatuses may provide reductions in the memory, file size, and/or data rate requirements per subframe for temporally-multiplexed displays.

Embodiments of the instant disclosure may include or be implemented in conjunction with various types of artificial reality systems. Artificial reality is a form of reality that has been adjusted in some manner before presentation to a user, which may include, e.g., a virtual reality (VR), an augmented reality, a mixed reality (MR), a hybrid reality, or some combination and/or derivative thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial reality systems may be implemented in a variety of different form factors and configurations. Some artificial reality systems may be designed to work without near-eye displays (NEDs), an example of which is augmented-reality system 800 in FIG. 8. Other artificial reality systems may include an NED that also provides visibility into the real world (e.g., augmented-reality system 900 in FIG. 9) or that visually immerses a user in an artificial reality (e.g., VR system 1000 in FIG. 10). While some artificial reality devices may be self-contained systems, other artificial reality devices may communicate and/or coordinate with external devices to provide an artificial reality experience to a user. Examples of such external devices include handheld controllers, mobile devices, desktop computers, devices worn by a user, devices worn by one or more other users, and/or any other suitable external system.

Figure 8:
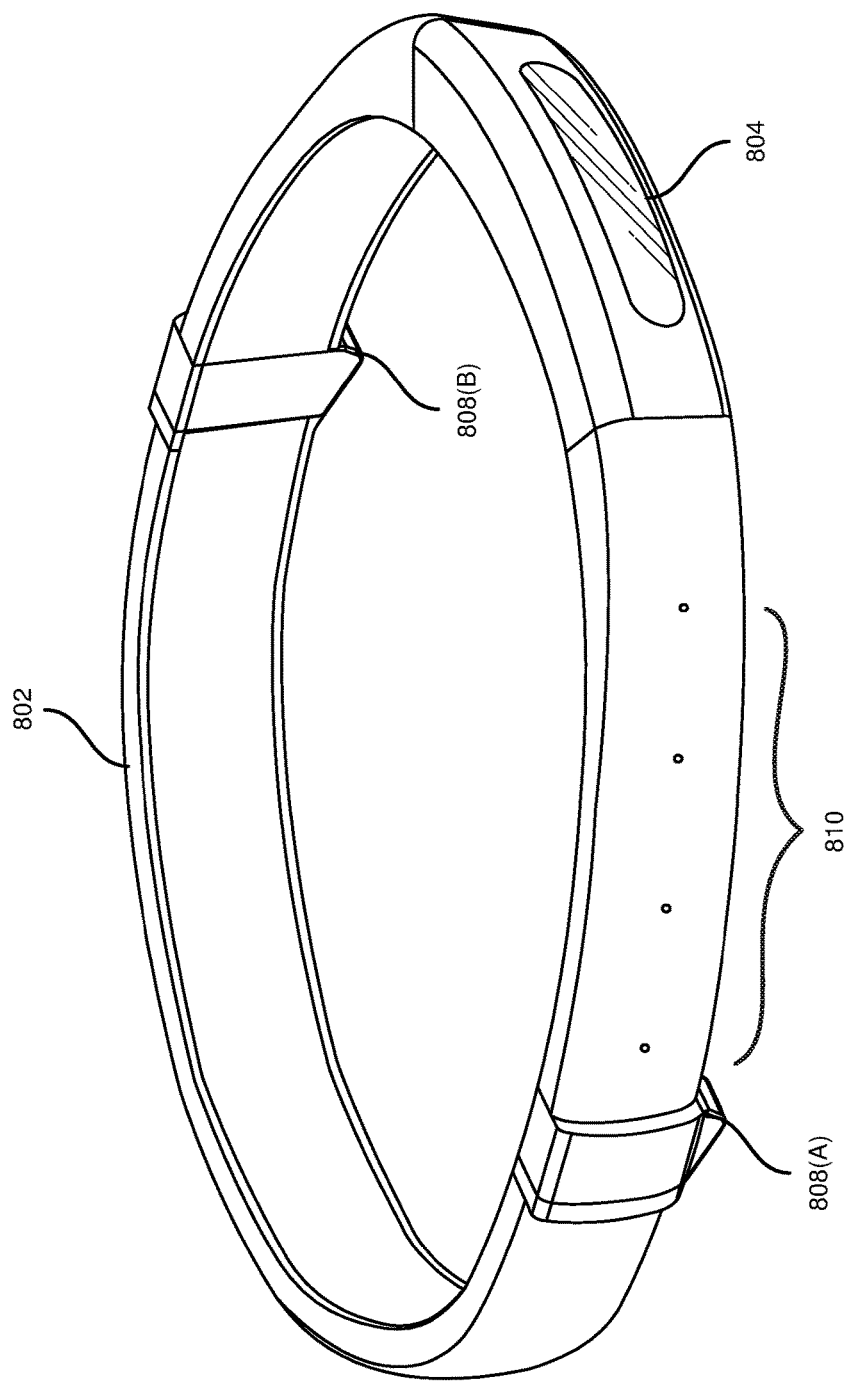
FIG. 8 is a perspective view of an exemplary augmented reality device into which the systems and apparatuses described herein may be incorporated, in accordance with some embodiments.

Turning to FIG. 8, augmented-reality system 800 generally represents a wearable device dimensioned to fit about a body part (e.g., a head) of a user. As shown in FIG. 8, system 800 may include a frame 802 and a camera assembly 804 that is coupled to frame 802 and configured to gather information about a local environment by observing the local environment. Augmented-reality system 800 may also include one or more audio devices, such as output audio transducers 808(A) and 808(B) and input audio transducers 810. Output audio transducers 808(A) and 808(B) may provide audio feedback and/or content to a user, and input audio transducers 810 may capture audio in a user's environment.

As shown, augmented-reality system 800 may not necessarily include an NED positioned in front of a user's eyes. Augmented-reality systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While augmented-reality system 800 may not include an NED, augmented-reality system 800 may include other types of screens or visual feedback devices (e.g., a display screen integrated into a side of frame 802).

Figure 9:
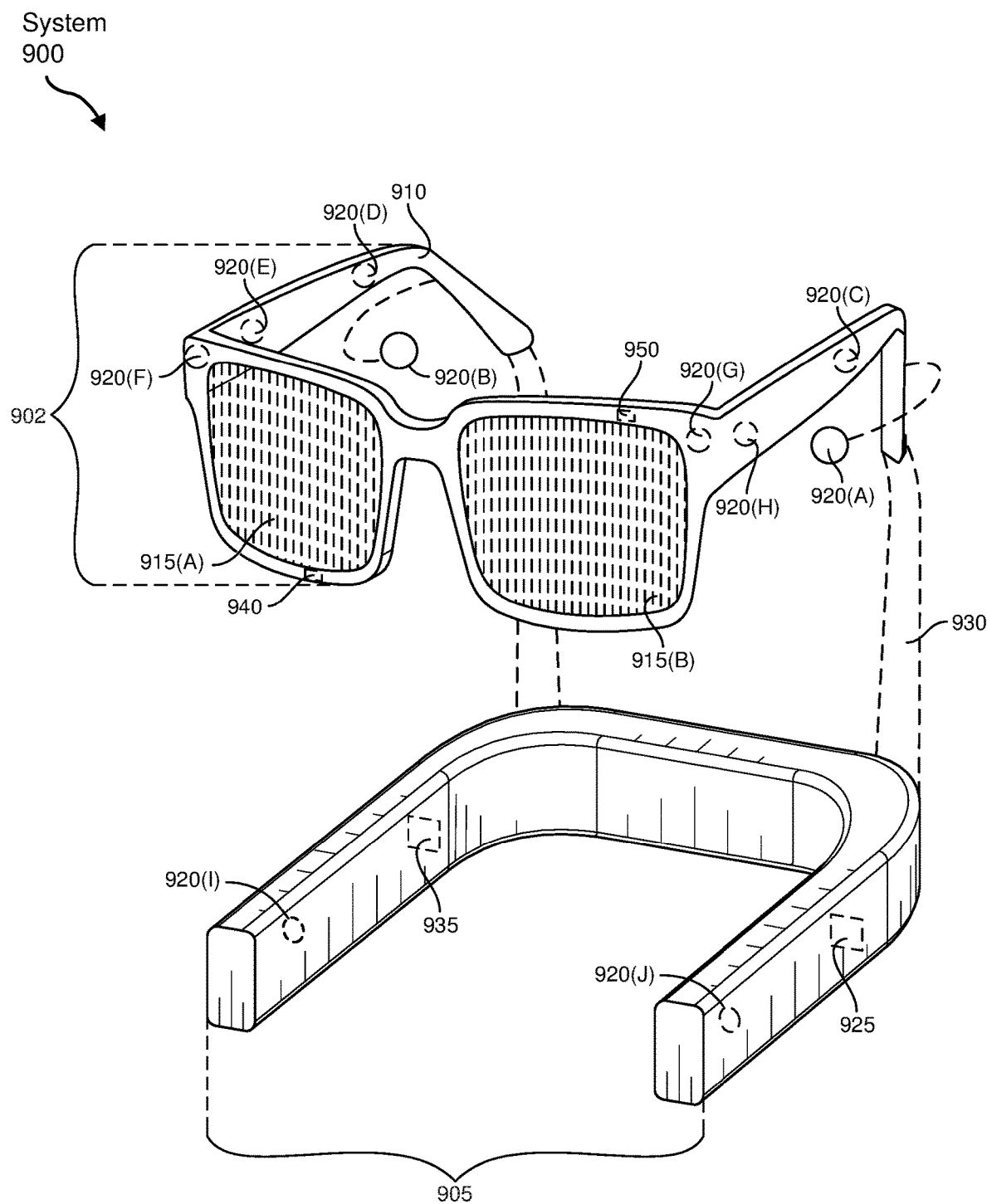
FIG. 9 is a perspective view of an exemplary augmented reality device into which the systems and apparatuses described herein may be incorporated, in accordance with some embodiments.

The embodiments discussed in this disclosure may also be implemented in augmented-reality systems that include one or more NEDs. For example, as shown in FIG. 9, augmented-reality system 900 may include an eyewear device 902 with a frame 910 configured to hold a left display device 915(A) and a right display device 915(B) in front of a user's eyes. Display devices 915(A) and 915(B) may act together or independently to present an image or series of images to a user. While augmented-reality system 900 includes two displays, embodiments of this disclosure may be implemented in augmented-reality systems with a single NED or more than two NEDs.

In some embodiments, augmented-reality system 900 may include one or more sensors, such as sensor 940. Sensor 940 may generate measurement signals in response to motion of augmented-reality system 900 and may be located on substantially any portion of frame 910. Sensor 940 may include a position sensor, an inertial measurement unit (IMU), a depth camera assembly, or any combination thereof. In some embodiments, augmented-reality system 900 may or may not include sensor 940 or may include more than one sensor. In embodiments in which sensor 940 includes an IMU, the IMU may generate calibration data based on measurement signals from sensor 940. Examples of sensor 940 may include, without limitation, accelerometers, gyroscopes, magnetometers, other suitable types of sensors that detect motion, sensors used for error correction of the IMU, or some combination thereof.

AR system 900 may also include a microphone array with a plurality of acoustic sensors 920(A)-920(J), referred to collectively as acoustic sensors 920. Acoustic sensors 920 may be transducers that detect air pressure variations induced by sound waves. Each acoustic sensor 920 may be configured to detect sound and convert the detected sound into an electronic format (e.g., an analog or digital format). The microphone array in FIG. 9 may include, for example, ten acoustic sensors: 920(A) and 920(B), which may be designed to be placed inside a corresponding ear of the user, acoustic sensors 920(C), 920(D), 920(E), 920(F), 920(G), and 920(H), which may be positioned at various locations on frame 910, and/or acoustic sensors 920(I) and 920(J), which may be positioned on a corresponding neckband 905.

The configuration of acoustic sensors 920 of the microphone array may vary. While augmented-reality system 900 is shown in FIG. 9 as having ten acoustic sensors 920, the number of acoustic sensors 920 may be greater or less than ten. In some embodiments, using higher numbers of acoustic sensors 920 may increase the amount of audio information collected and/or the sensitivity and accuracy of the audio information. In contrast, using a lower number of acoustic sensors 920 may decrease the computing power required by the controller 950 to process the collected audio information. In addition, the position of each acoustic sensor 920 of the microphone array may vary. For example, the position of an acoustic sensor 920 may include a defined position on the user, a defined coordinate on the frame 910, an orientation associated with each acoustic sensor, or some combination thereof.

Acoustic sensors 920(A) and 920(B) may be positioned on different parts of the user's ear, such as behind the pinna or within the auricle or fossa. Or, there may be additional acoustic sensors on or surrounding the ear in addition to acoustic sensors 920 inside the ear canal. Having an acoustic sensor positioned next to an ear canal of a user may enable the microphone array to collect information on how sounds arrive at the ear canal. By positioning at least two of acoustic sensors 920 on either side of a user's head (e.g., as binaural microphones), augmented-reality device 900 may simulate binaural hearing and capture a 3D stereo sound field around about a user's head. In some embodiments, acoustic sensors 920(A) and 920(B) may be connected to augmented-reality system 900 via a wired connection, and in other embodiments, the acoustic sensors 920(A) and 920(B) may be connected to augmented-reality system 900 via a wireless connection (e.g., a Bluetooth connection). In still other embodiments, acoustic sensors 920(A) and 920(B) may not be used at all in conjunction with augmented-reality system 900.

Acoustic sensors 920 on frame 910 may be positioned along the length of the temples, across the bridge, above or below display devices 915(A) and 915(B), or some combination thereof. Acoustic sensors 920 may be oriented such that the microphone array is able to detect sounds in a wide range of directions surrounding the user wearing the augmented-reality system 900. In some embodiments, an optimization process may be performed during manufacturing of augmented-reality system 900 to determine relative positioning of each acoustic sensor 920 in the microphone array.

AR system 900 may further include or be connected to an external device (e.g., a paired device), such as neckband 905. As shown, neckband 905 may be coupled to eyewear device 902 via one or more connectors 930. Connectors 930 may be wired or wireless connectors and may include electrical and/or non-electrical (e.g., structural) components. In some cases, eyewear device 902 and neckband 905 may operate independently without any wired or wireless connection between them. While FIG. 9 illustrates the components of eyewear device 902 and neckband 905 in example locations on eyewear device 902 and neckband 905, the components may be located elsewhere and/or distributed differently on eyewear device 902 and/or neckband 905. In some embodiments, the components of eyewear device 902 and neckband 905 may be located on one or more additional peripheral devices paired with eyewear device 902, neckband 905, or some combination thereof. Furthermore, neckband 905 generally represents any type or form of paired device. Thus, the following discussion of neckband 905 may also apply to various other paired devices, such as smart watches, smart phones, wrist bands, other wearable devices, hand-held controllers, tablet computers, laptop computers, etc.

Pairing external devices, such as neckband 905, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 900 may be provided by a paired device or shared between a paired device and an eyewear device, thus reducing the weight, heat profile, and form factor of the eyewear device overall while still retaining desired functionality. For example, neckband 905 may allow components that would otherwise be included on an eyewear device to be included in neckband 905 since users may tolerate a heavier weight load on their shoulders than they would tolerate on their heads. Neckband 905 may also have a larger surface area over which to diffuse and disperse heat to the ambient environment. Thus, neckband 905 may allow for greater battery and computation capacity than might otherwise have been possible on a stand-alone eyewear device. Since weight carried in neckband 905 may be less invasive to a user than weight carried in eyewear device 902, a user may tolerate wearing a lighter eyewear device and carrying or wearing the paired device for greater lengths of time than a user would tolerate wearing a heavy standalone eyewear device, thereby enabling an artificial reality environment to be incorporated more fully into a user's day-to-day activities.

Neckband 905 may be communicatively coupled with eyewear device 902 and/or to other devices. The other devices may provide certain functions (e.g., tracking, localizing, depth mapping, processing, storage, etc.) to augmented-reality system 900. In the embodiment of FIG. 9, neckband 905 may include two acoustic sensors (e.g., 920(I) and 920(J)) that are part of the microphone array (or potentially form their own microphone subarray). Neckband 905 may also include a controller 925 and a power source 935.

Acoustic sensors 920(I) and 920(J) of neckband 905 may be configured to detect sound and convert the detected sound into an electronic format (analog or digital). In the embodiment of FIG. 9, acoustic sensors 920(1) and 920(J) may be positioned on neckband 905, thereby increasing the distance between the neckband acoustic sensors 920(1) and 920(J) and other acoustic sensors 920 positioned on eyewear device 902. In some cases, increasing the distance between acoustic sensors 920 of the microphone array may improve the accuracy of beamforming performed via the microphone array. For example, if a sound is detected by acoustic sensors 920(C) and 920(D) and the distance between acoustic sensors 920(C) and 920(D) is greater than, e.g., the distance between acoustic sensors 920(D) and 920(E), the determined source location of the detected sound may be more accurate than if the sound had been detected by acoustic sensors 920(D) and 920(E).

Controller 925 of neckband 905 may process information generated by the sensors on neckband 905 and/or augmented-reality system 900. For example, controller 925 may process information from the microphone array that describes sounds detected by the microphone array. For each detected sound, controller 925 may perform a DoA estimation to estimate a direction from which the detected sound arrived at the microphone array. As the microphone array detects sounds, controller 925 may populate an audio data set with the information. In embodiments in which augmented-reality system 900 includes an inertial measurement unit, controller 925 may compute all inertial and spatial calculations from the IMU located on eyewear device 902. Connector 930 may convey information between augmented-reality system 900 and neckband 905 and between augmented-reality system 900 and controller 925. The information may be in the form of optical data, electrical data, wireless data, or any other transmittable data form. Moving the processing of information generated by augmented-reality system 900 to neckband 905 may reduce weight and heat in eyewear device 902, making it more comfortable to the user.

Power source 935 in neckband 905 may provide power to eyewear device 902 and/or to neckband 905. Power source 935 may include, without limitation, lithium ion batteries, lithium-polymer batteries, primary lithium batteries, alkaline batteries, or any other form of power storage. In some cases, power source 935 may be a wired power source. Including power source 935 on neckband 905 instead of on eyewear device 902 may help better distribute the weight and heat generated by power source 935.

As noted, some artificial reality systems may, instead of blending an artificial reality with actual reality, substantially replace one or more of a user's sensory perceptions of the real world with a virtual experience. One example of this type of system is a head-worn display system, such as VR system 1000 in FIG. 10, that mostly or completely covers a user's field of view. VR system 1000 may include a front rigid body 1002 and a band 1004 shaped to fit around a user's head. VR system 1000 may also include output audio transducers 1006(A) and 1006(B). Furthermore, while not shown in FIG. 10, front rigid body 1002 may include one or more electronic elements, including one or more electronic displays, one or more inertial measurement units (IMUS), one or more tracking emitters or detectors, and/or any other suitable device or system for creating an artificial reality experience.

Artificial reality systems may include a variety of types of visual feedback mechanisms. For example, display devices in augmented-reality system 900 and/or VR system 1000 may include one or more liquid crystal displays (LCDs), light emitting diode (LED) displays, organic LED (OLED) displays, and/or any other suitable type of display screen. Artificial reality systems may include a single display screen for both eyes or may provide a display screen for each eye, which may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial reality systems may include one or more projection systems. For example, display devices in augmented-reality system 900 and/or VR system 1000 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. Artificial reality systems may also be configured with any other suitable type or form of image projection system.

Artificial reality systems may also include various types of computer vision components and subsystems. For example, augmented-reality system 800, augmented-reality system 900, and/or VR system 1000 may include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. In the examples shown in FIGS. 8 and 10, output audio transducers 808(A), 808(B), 1006(A), and 1006(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 810 may include condenser microphones, dynamic microphones, ribbon microphones, and/or any other type or form of input transducer. In some embodiments, a single transducer may be used for both audio input and audio output.

Figure 10:
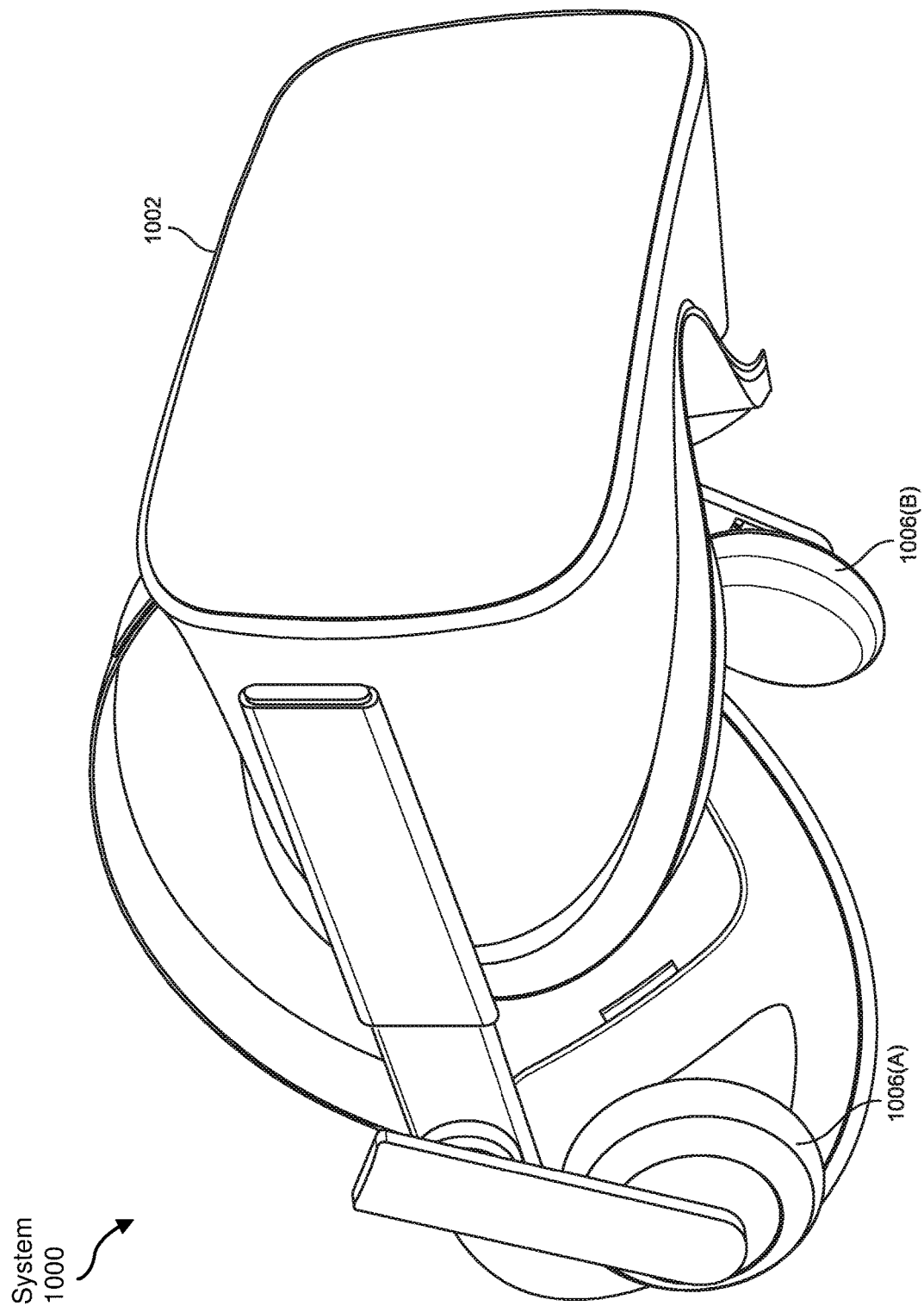
FIG. 10 is a perspective view of an exemplary virtual reality device into which the systems and apparatuses described herein may be incorporated, in accordance with some embodiments.

While not shown in FIGS. 8-10, artificial reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial reality experience in one or more of these contexts and environments and/or in other contexts and environments.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices may include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors may include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

In some embodiments, the term "computer-readable medium" generally refers to any form of device, carrier, or medium capable of storing or carrying computer-readable instructions. Examples of computer-readable media may include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY, disks), electronic-storage media (e.g., solid-state drives and flash media), and other distribution systems.

The process parameters and sequence of the steps described and/or illustrated herein may be given by way of example only and may be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or may include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations may be possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
receiving image data for an image at a first location, the image data comprising a set of intensities distributed in one or more channels;
processing the image data into subframe data for a plurality of subframes, wherein subframe data for each subframe of the plurality of subframes comprises a fractional range of intensities that are a subset of the set of intensities of the image data;
transferring the subframe data for the plurality of subframes to a second location, wherein the first location and the second location are located in a head-mounted display; and
temporally multiplexing the plurality of subframes generated from the subframe data to reconstitute the image in a viewing region, wherein each of a plurality of subpixels of the image displayed in the viewing region is formed by light from two or more separate emissive subpixels of an emissive array during two or more subframes of the plurality of subframes.

2. The method of claim 1, wherein the subframe data for each subframe of the plurality of subframes comprises a unique fractional range of intensities of the subset of the set of intensities of the image data.

3. The method of claim 1, further comprising transferring subframe data for a set of subframes of the plurality of subframes to the second location, wherein the subframe data for the set of subframes is specific to a channel or combination of channels of the one or more channels of the image data.

4. The method of claim 3, wherein each subframe of the set of subframes is specific to a channel or a combination of channels and comprises a dimensional size at the first location that comprises only a portion of the image that is specific to the channel or the combination of channels.

5. The method of claim 4, wherein each subframe of the set of subframes at the second location is either expanded to a dimensional size of the image and co-added with one or more additional subframes or is unchanged in dimensional size.

6. The method of claim 1, wherein the plurality of subframes comprises four or more subframes.

7. The method of claim 1, further comprising processing the image data to determine a set of relative frequencies of intensities from the subset of the set of intensities of the image data, wherein the subframe data for each subframe of the plurality of subframes has a fractional range of intensities determined from the set of relative frequencies of intensities.

8. The method of claim 1, further comprising compressing at least a subset of the set of intensities of the image data at the first location.

9. The method of claim 1, reducing a minimum value for the fractional range of intensities for the subframe data for each subframe by a zero-point offset that is used to restore the minimum value of the subframe data for that subframe at the second location.

10. The method of claim 1, wherein each of a plurality of subpixels of the image displayed in the viewing region is formed by light from two or more separate subpixels of the emissive array laterally shifted by a light deviator during two or more subframes of the plurality of subframes.

11. The method of claim 1, wherein the plurality of subframes are temporally multiplexed using an optical system that:
receives light from at least one of a plurality of emissive subpixels of the emissive array and laterally shifts the received light by a light deviator that is movable between a plurality of positions corresponding to one or more lateral-light-shifting degrees of freedom, each of the plurality of subframes corresponding to a different predetermined position of the light deviator; and
directs the laterally shifted light toward the viewing region.

12. A head-mounted display system comprising:
a receiver module, stored in memory, that receives image data for an image, the image data comprising a set of intensities distributed in one or more channels;
a subframe module, stored in memory, that processes the image data into subframe data for a plurality of subframes and transfers the subframe data from a first location to a second location, wherein the first location and the second location are located in the head-mounted display system, wherein subframe data for each subframe of the plurality of subframes comprises a fractional range of intensities that are a subset of the set of intensities of the image data;
an emissive array comprising a plurality of emissive subpixels;
a multiplexing module, stored in memory, that temporally multiplexes the plurality of subframes generated from the subframe data to reconstitute the image in a viewing region, wherein each of a plurality of subpixels of the image displayed in the viewing region is formed by light from two or more separate emissive subpixels of the emissive array during two or more subframes of the plurality of subframes; and
at least one processor configured to execute the receiver module, the subframe module, and the multiplexing module.

13. The head-mounted display system of claim 12, wherein the subframe data for each subframe of the plurality of subframes comprises a unique fractional range of intensities of the subset of the set of intensities of the image data.

14. The head-mounted display system of claim 12, wherein the subframe data for a set of subframes of the plurality of subframes is specific to a channel or a combination of channels of the one or more channels of the image data.

15. The head-mounted display system of claim 12, wherein the plurality of subframes comprises four or more subframes.

16. The head-mounted display system of claim 12, wherein:
the subframe module is further configured to determine a set of relative frequencies of intensities from the subset of the set of intensities of the image data; and
each subframe of the plurality of subframes has a fractional range of intensities determined from the set of relative frequencies of intensities.

17. The head-mounted display system of claim 12, wherein the subframe module is further configured to compress at least a subset of the set of intensities of the image data.

18. The head-mounted display system of claim 12, further comprising an optical system that:
receives light from at least one of the plurality of emissive subpixels of the emissive array and laterally shifts the received light by a light deviator that is movable between a plurality of positions corresponding to one or more lateral-light-shifting degrees of freedom, each of the plurality of subframes corresponding to a different predetermined position of the light deviator; and
directs the laterally shifted light toward a viewing region.

19. A head-mounted display system comprising:
an emissive array comprising a plurality of emissive subpixels; and
a data input circuit configured to:
receive subframe data for a plurality of subframes, wherein the subframe data for each subframe of the plurality of subframes comprises a plurality of subframe elements, wherein each subframe element comprises a value;
transfer the subframe data from a first location to a second location, wherein the first location and the second location are located in the head-mounted display system;
process the subframe data for the plurality of subframes, wherein the values of the plurality of subframe elements are converted into an array of intensities comprising a plurality of intensity elements; and for each intensity element of the array of intensities:
map each intensity element to a corresponding subpixel in the plurality of emissive subpixels of the emissive array;
convert an intensity of each intensity element into one or more illumination parameters for the corresponding subpixel; and
cause each subpixel of the emissive array to be illuminated using the one or more corresponding illumination parameters, wherein each of a plurality of subpixels of an image displayed in a viewing region is formed by light from two or more separate emissive subpixels of the emissive array during two or more subframes of the plurality of subframes.

20. The head-mounted display system of claim 19, wherein converting the intensity of each intensity element into one or more illumination parameters for the corresponding subpixel comprises at least one of a shift, a scaling, or a decompression.

* * * * *